US012728406B2

(12) United States Patent
Kwon et al.

(10) Patent No.: US 12,728,406 B2
(45) Date of Patent: Sep. 8, 2026

(54) NITROGEN OXIDE REMOVING DENITRIFICATION CATALYST HAVING HIGH DURABILITY AGAINST SULFUR DIOXIDE, METHOD FOR PREPARING THE SAME, AND METHOD FOR REMOVING NITROGEN OXIDE USING THE SAME

(71) Applicant: KOREA INSTITUTE OF SCIENCE AND TECHNOLOGY, Seoul (KR)

(72) Inventors: Dong Wook Kwon, Seoul (KR); Heon Phil Ha, Seoul (KR); Min Gie Jung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 617 days.

(21) Appl. No.: 18/193,473

(22) Filed: Mar. 30, 2023

(65) Prior Publication Data

US 2024/0066503 A1 Feb. 29, 2024

(30) Foreign Application Priority Data

Aug. 29, 2022 (KR) ........................ 10-2022-0108694
Nov. 8, 2022 (KR) ........................ 10-2022-0147666

(51) Int. Cl.
*B01J 23/28* (2006.01)
*B01D 53/86* (2006.01)
(Continued)

(52) U.S. Cl.
CPC .......... *B01J 23/28* (2013.01); *B01D 53/8628* (2013.01); *B01J 21/063* (2013.01); *B01J 35/50* (2024.01); *B01J 35/51* (2024.01); *B01J 35/54* (2024.01); *B01J 35/56* (2024.01); *B01J 37/0219* (2013.01); *B01J 37/0221* (2013.01);
(Continued)

(58) Field of Classification Search
None
See application file for complete search history.

(56) References Cited

U.S. PATENT DOCUMENTS

2022/0055018 A1 2/2022 Zhao

FOREIGN PATENT DOCUMENTS

KR 10-1426601 B1 8/2014
KR 10-2021-0049215 A 5/2021
(Continued)

OTHER PUBLICATIONS

Dong Wook Kwon et al., "The role of molybdenum on the enhanced performance and SO2 resistance of V/Mo—Ti catalysts for NH3-SCR," Applied Surface Science, 2019, vol. 481, pp. 1167-1177.
Yunfan Xu et al., "SO2 promoted V2O5—MoO3/TiO2 catalyst for NH3-SCR of NOx at low temperatures," Applied Catalysis A, 2019, General 570, pp. 42-50.
Yue Qiu et al., "The monolithic cordierite supported V2O5—MoO3/TiO2 catalyst for NH3-SCR," Chemical Engineering Journal, 2016, vol. 294, pp. 264-272.
(Continued)

*Primary Examiner* — Daniel Berns

(57) ABSTRACT

Provided is a nitrogen oxide removing denitrification catalyst having high durability against sulfur dioxide, a preparing method of the same, and a method for removing nitrogen oxide using the same. The denitrification catalyst is a quaternary denitrification catalyst containing vanadium-molybdenum-antimony-titania used in a selective catalytic reduction (SCR) reaction using an ammonia reductant to remove nitrogen oxides included in exhaust gases, antimony, molybdenum and vanadium are carried on a titania carrier, and molybdenum and vanadium are combined to be present in a form of a complex oxide ($V_2MoO_8$).

5 Claims, 13 Drawing Sheets

(51) Int. Cl.

*B01J 21/06* (2006.01)
*B01J 35/50* (2024.01)
*B01J 35/51* (2024.01)
*B01J 35/54* (2024.01)
*B01J 35/56* (2024.01)
*B01J 37/02* (2006.01)
*B01J 37/04* (2006.01)
*B01J 37/08* (2006.01)

(52) U.S. Cl.

CPC ........... *B01J 37/0236* (2013.01); *B01J 37/04* (2013.01); *B01J 37/088* (2013.01); *B01D 2251/2062* (2013.01); *B01D 2255/20723* (2013.01); *B01D 2255/20769* (2013.01); *B01D 2255/2098* (2013.01); *B01D 2255/40* (2013.01); *B01D 2257/404* (2013.01)

(56) References Cited

FOREIGN PATENT DOCUMENTS

| | | | |
|---|---|---|---|
| KR | 10-2021-0094092 | A | 7/2021 |
| KR | 10-2022-0037625 | A | 3/2022 |

OTHER PUBLICATIONS

Zhiming Liu et al., "Selective catalytic reduction of NOx by NH3 over MoO3-promoted CeO2/TiO2 catalyst," Catalysis Communications, 2014, vol. 46, pp. 90-93.

Dong Wook Kwon et al., "New insight into the role of Mo—Sb addition towards VMoSbTi catalysts with enhanced activity for selective catalytic reduction with NH3," Chemical Engineering Journal, 2022, vol. 428, 132078.

Preparation Example 2

Comparative Preparation Example 4

Comparative Preparation Example 7

Comparative Preparation Example 8

NITROGEN OXIDE REMOVING DENITRIFICATION CATALYST HAVING HIGH DURABILITY AGAINST SULFUR DIOXIDE, METHOD FOR PREPARING THE SAME, AND METHOD FOR REMOVING NITROGEN OXIDE USING THE SAME

STATEMENT REGARDING PRIOR ART DISCLOSURES BY THE INVENTOR OR A JOINT INVENTOR

The inventors of the present application have made related disclosure in Dong Wook Kwon et al., "New insight into the role of Mo—Sb addition towards VMoSbTi catalysts with enhanced activity for selective catalytic reduction with NH3," Chemical Engineering Journal, 2022, Volume 428, 132078. The related disclosure was available online on Aug. 28, 2021. Since the end of the one-year grace period (Aug. 28, 2022) was Sunday, the one-year grace period is extended to the next succeeding business day (Aug. 29, 2022). MPEP 2153.01(a). Thus, the present application was effectively filed on Aug. 29, 2022 within the one-year grace period. The authors of the related disclosure include two authors, Jeongeun Choi and Ki Bok Nam, who are not the joint inventors of the present application. These authors worked as an equipment operator and a technician and did not make contribution to conception of the invention, and thus are not included in the joint inventors of the present application. Accordingly, the related disclosure is disqualified as prior art under 35 USC 102(a)(1) against the present application. See MPEP 2155.01 and 35 USC 102(b)(1)(A).

CROSS-REFERENCE TO RELATED APPLICATIONS

This U.S. non-provisional patent application claims priority under 35 U.S.C. § 119 of Korean Patent Application Nos. 10-2022-0108694, filed on Aug. 29, 2022, and 10-2022-0147666, filed on Nov. 8, 2022, the entire contents of which are hereby incorporated by reference.

BACKGROUND

The present disclosure herein relates to a nitrogen oxide removing denitrification (de-$NO_x$) catalyst having high durability against sulfur dioxide, a method for manufacturing the same, and a method for removing a nitrogen oxide using the same.

Recently, a nitrogen oxide is known as a major air pollutant that is generated from industrial boilers, thermoelectric power plants, and waste incineration facilities and causes ultrafine dust precursors, photochemical smog, destruction of an ozone layer, and global warming. Accordingly, various methods for removing nitrogen oxides have been researched and developed, and among the methods, a selective catalytic reduction (hereinafter referred to as "SCR") technology is widely used. The SCR is a technology in which ammonia, which is a reducing agent, reacts with nitrogen oxides in the presence of a catalyst to be selectively decomposed into nitrogen and water.

A denitrification catalyst which may be applied to SCR reaction using ammonia as a reducing agent may be prepared in various ways. Various catalysts from noble metal catalysts to base metal catalysts have been proposed, and it is known that the interaction between a carried active material and a carrier greatly affects a denitrification performance. Specifically, it has been reported that a vanadium-tungsten-titania catalyst and a vanadium-molybdenum-titania catalyst, which are commercially available catalysts widely used in SCR recently, show excellent denitrification efficiency at about 300° C. to about 400° C.

However, the catalysts commercialized up to now have a limitation in that it is difficult to carry out SCR reaction due to low activation energy at a temperature of at most about 300° C.

Currently, in the South Korea, there is an increasing interest in applying the SCR process to a cleaning facility for exhaust gases produced from sintering furnaces in steelworks, a cement manufacturing process, and a chemical process in order to improve denitrification efficiency. When a vanadium-based commercially available catalyst (vanadium-tungsten-titania catalyst) is used in applying the existing SCR process to the above-mentioned applications, a process for increasing temperature is required to maintain a temperature of about 300° C. to about 400° C. Accordingly, there is a demand for a catalyst which shows excellent efficiency in a low-temperature range with a temperature of at most about 300° C., which is the temperature of a space where the SCR process is applicable without additional heating of exhaust gases. In addition, the above-mentioned process requires a catalyst, in a low-temperature SCR, capable of operating for a long time even in an environment of exhaust gases that contain sulfur dioxides ($SO_2$) generated during fossil fuel combustion. When exhaust gases contain sulfur dioxide, a side reaction occurs, and at this time, sulfur dioxide is oxidized to sulfur trioxide ($SO_3$) by an oxidation reaction on a catalyst surface. Sulfur trioxide reacts with ammonia, which is a reducing agent, and moisture contained in exhaust gases, and thus forms ammonium sulfate salts ($NH_4HSO_4$ and $(NH_4)_2SO_4$). This reaction proceeds faster at a lower temperature. Since the ammonium sulfate salt is deposited on the surface of the catalyst, an active site of the catalyst is blocked, thereby not only reducing the performance of the catalyst, but also causing corrosion of an underlying device and an inner wall. To suppress forming of ammonium sulfate salt in a denitrification catalyst layer, sulfur dioxide is removed in a front-stage desulfurization facility. However, moisture is supplied to improve the desulfurization efficiency, and at this time, the temperature of the exhaust gases rapidly decreases to lower the denitrification performance in a subsequent process. As a solution to this phenomenon, a process of reheating the exhaust gases using a duct burner is required. Since a secondary pollutant is produced from fuel used during reheating and energy efficiency decreases, this method is undesirable. In addition, although sulfur dioxide is removed considering economic and environmental regulations, it is difficult to remove the sulfur dioxide with 100% efficiency, and some sulfur dioxide (several tens of ppm) exists in exhaust gases to result in deterioration of the performance of the denitrification catalyst. Therefore, there is a demand for a denitrification catalyst exhibiting high efficiency at a temperature of at most about 300° C. and having excellent durability against sulfur dioxide. Hereinafter, technical contents of prior literatures related to denitrification catalysts applied to SCR systems will be reviewed.

A denitrification catalyst composed of vanadium oxide-molybdenum oxide-titanium oxide is disclosed in Korean Patent Registration No. 10-1426601" (hereinafter referred to as "Related Art 1") and in "Applied Surface Science, 481 (2019) 1167-1177" (hereinafter referred to as "Related Art 2"). In particular, it is disclosed that, when sulfur dioxide is contained in exhaust gases, molybdenum oxide contains at least about 150 atoms/$cm^3$ of molybdenum ($Mo^{6+}$) having an oxidation number of +6, titanium ($Ti^{3+}$) having an oxidation number of +3 has an atomic ratio ($Ti^{3+}/(Ti^{4+}+Ti^{3+})$) of at most about 0.3 among titanium oxides, and the precursor of titanium oxide is amorphous meta titanic acid ($TiO_2 \cdot xH_2O$) in order to suppress ammonium sulfate salts from being formed.

In "Applied Catalysis A, General 570(2019) 42-50" (hereinafter referred to as "Related Art 3"), a study shows that a denitrification catalyst composed of vanadium oxide-molybdenum oxide-titanium oxide has improved durability against sulfur dioxide by promoting polymeric vanadate and Brønsted acid sites due to an addition of molybdenum.

In "Chemical Engineering Journal 294 (2016) 264-272" (hereinafter referred to as "Related Art 4"), a denitrification catalyst composed of vanadium oxide-molybdenum oxide-titanium oxide, prepared by impregnation and applied on a cordierite ceramic honeycomb, changed crystallization and redox characteristics of vanadium oxide by controlling an amount of active species according to the Mo/V ratio. The study shows that, when the Mo/V ratio was changed from 2 to 8, performance was improved by more than about 80% at about 350° C. to about 450° C., and at a Mo/V ratio of 8, durability against sulfur oxide and moisture was partially improved.

In "Catalysis Communications 46 (2014) 90-93" (hereinafter referred to as "Related Art 5"), a study shows that a denitrification catalyst has a promoted denitrification performance by adding molybdenum oxide to cerium oxide-titanium oxide, and, in particular, improves durability by suppressing the adsorption of sulfur oxides and moisture. The study shows that an addition of molybdenum oxide promotes denitrification performance because Brønsted acid sites are formed and cerium oxides are crystallized.

As described above, currently studies on nitrogen oxide removing catalysts are mainly focused on: increasing a denitrification rate at low-temperature through addition of molybdenum to vanadium oxide/titanium oxide, improving resistance to sulfur dioxide to promote catalyst performance as disclosed in Related Arts 1 through 3; or enhancing the crystallization and oxidation-reduction ability of oxides by coating a cordierite ceramic honeycomb with vanadium oxide/titanium oxide, or improving acid site formation and denitrification performance by adding molybdenum to ceria/titania, as disclosed in Related Art 4.

However, studies are not yet actively conducted on a method that remarkably improves an active site of the catalyst and an oxidation state of an active component at low temperatures, and thus achieves more excellent efficiency of removal of nitrogen oxides and enhances durability against sulfur dioxide at a temperature of at most about 300° C. in order to prepare a denitrification catalyst that is highly active at a low temperature and has high durability. Considering this situation, it can be said that there is a demand for research and development on a method capable of improving the activity and durability of a catalyst in a complex way.

SUMMARY

The present disclosure provides a denitrification catalyst exhibiting excellent removal activity for nitrogen oxide and improved durability against sulfur dioxide in a low-temperature range of about 300° C. or lower.

The present disclosure also provides a method for preparing the denitrification catalyst.

The present disclosure also provides a method for removing nitrogen oxide using the method for preparing the denitrification catalyst.

An embodiment of the inventive concept provides a quaternary denitrification catalyst containing vanadium-molybdenum-antimony-titania used in a selective catalytic reduction (SCR) reaction using an ammonia reductant to remove nitrogen oxides included in exhaust gases, antimony, molybdenum, and vanadium are carried on a titania carrier, and molybdenum and vanadium are combined to be present in a form of a complex oxide ($V_2MoO_8$).

In an embodiment of the inventive concept, a method for preparing a quaternary denitrification catalyst containing vanadium-molybdenum-antimony-titania used in a selective catalytic reduction (SCR) reaction using an ammonia reductant to remove nitrogen oxides included in exhaust gases includes: dissolving about 0.5 wt % to about 5 wt % of antimony in a precursor type in a solvent with respect to 100 parts by weight of the catalyst to prepare an antimony aqueous solution; dissolving about 0.5 wt % to about 5 wt % of molybdenum in a precursor type in a solvent with respect to 100 parts by weight of the catalyst to prepare a molybdenum aqueous solution; dissolving about 1 wt % to about 5 wt % of vanadium in a precursor type in a solvent with respect to 100 parts by weight of the catalyst to prepare a vanadium aqueous solution; mixing the antimony aqueous solution, the molybdenum aqueous solution and the vanadium aqueous solution with a titanium oxide carrier to prepare a slurry; and drying the slurry and then baking the slurry at about 300° C. to about 700° C. to prepare a vanadium-molybdenum-antimony-titania catalyst.

In an embodiment of the inventive concept, a method for removing nitrogen oxide in exhaust gases using the denitrification catalyst includes causing the denitrification catalyst to pass through exhaust gas containing ammonia and nitrogen or exhaust gas containing ammonia, nitrogen oxide, and sulfur dioxide.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
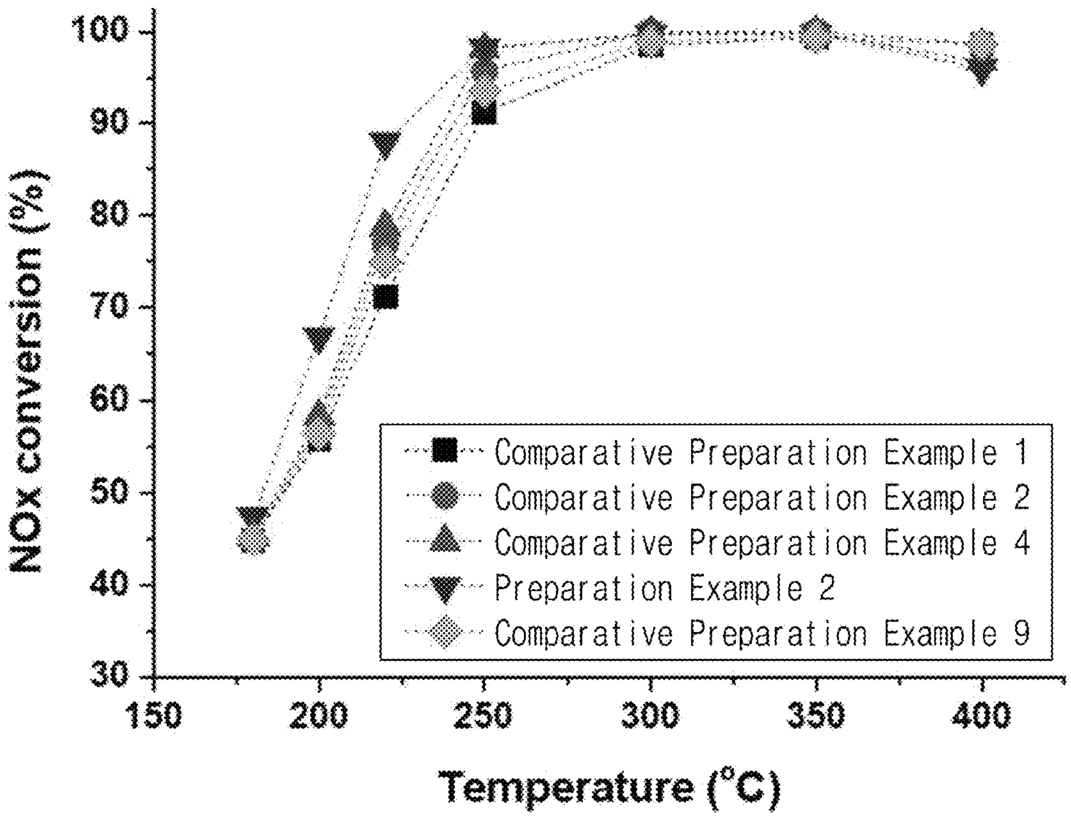
FIG. 1 is a graph showing evaluation results of denitrification performance, using an ammonia reductant, of catalysts prepared according to Comparative Preparation Examples 1, 2 and 4, Preparation Example 2, and Comparative Preparation Example 9, in order to evaluate the denitrification performance of a denitrification catalyst according to the inventive concept.
Figure 2:
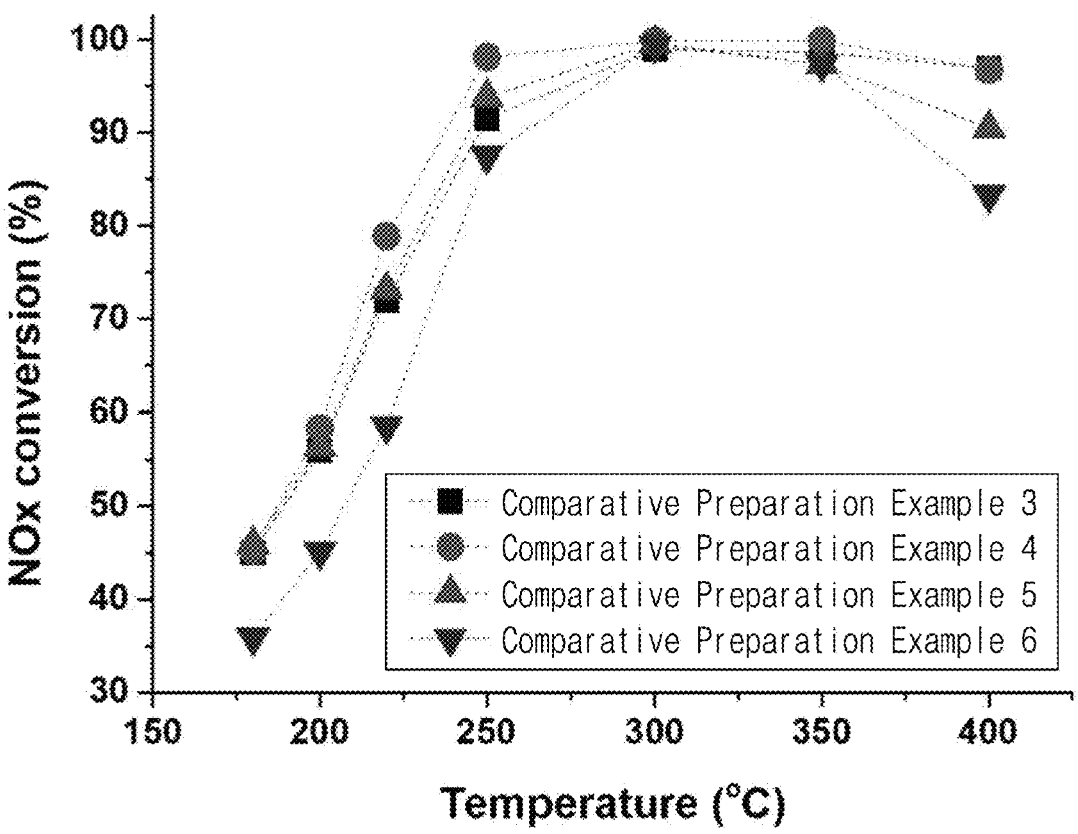
FIG. 2 is a graph showing evaluation results of denitrification performance, using an ammonia reductant, of catalysts prepared according to Comparative Preparation Examples 3 through 6, with regard to denitrification performance of a denitrification catalyst according to the inventive concept.

Hereinafter, an embodiment of the inventive concept will be described in detail with reference to the accompanying drawings so that a person with ordinary skill in the art can easily carry out.

In a method for preparing a denitrification catalyst for removal of nitrogen oxide according to the inventive concept, a denitrification catalyst exhibiting excellent nitrogen oxide removal efficiency in a low-temperature range of below about 300° C. and having excellent durability against sulfur dioxide may be prepared through adding antimony to control oxidation numbers of vanadium and molybdenum.

The denitrification catalyst may be named as a 'vanadium-molybdenum-antimony-titania catalyst.'

Specifically, the vanadium-molybdenum-antimony-titania catalyst may be prepared by carrying antimony, molybdenum, and vanadium on titania carrier, and then drying and calcining the same. That is, physical properties of the vanadium-molybdenum-antimony-titania catalyst may be artificially changed through addition of a cocatalyst (antimony) to make the catalyst have a maximized activity for converting selectively nitrogen oxides and durability against sulfur dioxide.

At this time, the catalyst may be prepared by adding molybdenum in different amounts ranging from about 1 wt % to about 7 wt % with respect to the weight of the catalyst.

In this case, through adding a cocatalyst, a ratio of vanadium ($V^{4+}$+$V^{3+}$) having an oxidation number of +4 and +3 to the total amount of vanadium in vanadium oxides, may be adjusted to at least about 25%, and a ratio of molybdenum ($Mo^{6+}$) having an oxidation number of +6 to a total amount of molybdenum in molybdenum oxides may be adjusted to about at least 80%.

In addition, when the impregnation method is used to prepare a vanadium-molybdenum-antimony-titania catalyst, a catalyst may be prepared through drying and heat treatment while changing a method and order of carrying each element.

Furthermore, vanadium-molybdenum-antimony-titania catalyst may be prepared by adding vanadium, which is a main catalyst, in different amounts ranging from about 1 wt % to about 5 wt % with respect to the weight of the catalyst.

Herein, X-ray photoelectron spectroscopy (XPS) analysis is used in order to analyze a state of oxidation number of carried vanadium. Through the XPS analysis, types and distribution proportions of oxides present on the catalyst surface may be analyzed by separating the characteristic peak of each element present on the catalyst surface on the basis of intrinsic binding energy of the oxide containing the element, and each peak may be separated by the Gaussian-Lorentzian method. Therefore, through the XPS analysis, it may be directly confirmed how a change in an oxidation number of vanadium as an active material made by adding a cocatalyst, according to an embodiment of the inventive concept, influences a catalyst activity for selectively converting nitrogen oxide to nitrogen and durability against sulfur dioxide in a low-temperature range.

Hereinafter, methods for preparing a vanadium-molybdenum-antimony-titania catalyst and a vanadium-molybdenum-titania catalyst will be described in detail on the basis of the above-mentioned contents.

An antimony precursor, a molybdenum precursor, and a vanadium precursor are introduced into a titania carrier to prepare a mixed slurry and then the mixed slurry is dried and calcined to prepare a vanadium-molybdenum-antimony-titania catalyst. A molybdenum precursor and a vanadium precursor are introduced into a titania carrier to prepare a mixed slurry and then the mixed slurry is dried and calcined to prepare a vanadium-molybdenum-titania catalyst.

The titania carrier may be an amorphous titanic acid ($TiO_x(OH)_{4-2x}$), a crystalline anatase-type titanium dioxide, a rutile-type titanium dioxide, or a titanium dioxide in which anatase and rutile types are mixed.

In addition, the vanadium precursor may be ammonium metavanadate ($NH_4VO_3$) or vanadium oxytrichloride ($VOCl_3$). The vanadium content may range from about 0.5 wt % to about 10.0 wt %, preferably about 1.0 wt % to about 5.0 wt %, with respect to a titania carrier. When the vanadium content is less than about 1.0 wt %, the nitrogen oxide removal effect may be insufficient, and when the vanadium content exceeds about 5.0 wt %, a nitrogen oxide removal efficiency may not be satisfactory despite high vanadium content.

Meanwhile, the molybdenum precursor may be introduced into the titania carrier as a cocatalyst using a wet impregnation method. In the inventive concept, the molybdenum precursor may be any one selected from the group consisting of ammonium molybdate ($(NH_4)_2MoO_4$), ammonium molybdate tetrahydrate ($(NH_4)_6Mo_7O_{24}$ $4H_2O$), and molybdenum acid ($H_2MoO_4$). Although not particularly limited, the molybdenum precursor may be preferably ammonium molybdate tetrahydrate ($(NH_4)_6Mo_7O_{24}\cdot 4H_2O$). A molybdenum content may range from about 0.5 wt % to about 10.0 wt %, preferably about 3 wt %, with respect to the catalyst.

Meanwhile, an antimony precursor may be introduced into the titania carrier as a cocatalyst using a wet impregnation method. The antimony precursor may be any one selected from the group consisting of antimony trichloride ($SbCl_3$) and antimony acetate ($Sb(CH_3COO)_3$. Although not particularly limited, the antimony precursor may be preferably antimony acetate ($Sb(CH_3COO)_3$). An antimony content may range from about 0.5 wt % to about 5 wt %, preferably 2 wt %, with respect to the catalyst.

In a method for preparing a vanadium-molybdenum-antimony-titania catalyst, first, an antimony precursor corresponding to about 2 wt % of antimony is dissolved in acetic acid ($CH_3COOH$) to prepare an antimony aqueous solution. At this time, antimony acetate ($Sb(CH_3COO)_3$) is used as the antimony precursor. Then, a molybdenum precursor corresponding to about 3 wt % of molybdenum is dissolved in distilled water to prepare a molybdenum aqueous solution. At this time, ammonium molybdate tetrahydrate ($(NH_4)_6Mo_7O_{24}$ $4H_2O$) is used as the molybdenum precursor. Thereafter, a vanadium precursor corresponding to about 2 wt % of vanadium is dissolved in distilled water to prepare a vanadium aqueous solution. At this time, ammonium metavanadate ($NH_4VO_3$) is used as the vanadium precursor. Thereafter, the antimony aqueous solution, the molybdenum aqueous solution, and the vanadium aqueous solution are mixed with titania carrier and stirred and dried in a slurry state, and then the resultant slurry is dried at 103° C. for at least one day to remove residual moisture contained in micropores of the catalyst. After the drying process is completed, a sample undergoes heat treatment under an air atmosphere. That is, a vanadium-molybdenum-antimony-titania catalyst is prepared using titania as a carrier and using the antimony aqueous solution with a concentration of about 2 wt %, the molybdenum aqueous solution with a concentration of about 3 wt %, and the vanadium aqueous solution with a concentration of about 2 wt %.

In method for preparing of a vanadium-molybdenum-titania catalyst, first, a molybdenum precursor corresponding to about 3 wt % of molybdenum is dissolved in distilled water to prepare a molybdenum aqueous solution. At this time, ammonium molybdate tetrahydrate ($(NH_4)_6Mo_7O_{24}$ $4H_2O$) is used as the molybdenum precursor. Thereafter, a vanadium precursor corresponding to about 2 wt % of vanadium is dissolved in distilled water to prepare a vanadium aqueous solution. At this time, ammonium metavanadate ($NH_4VO_3$) is used as a vanadium precursor. Thereafter, the molybdenum, and vanadium aqueous solutions are mixed with titania carrier and stirred in a slurry state, the slurry is dried, and then an obtained is dried using at 103° C. for one day or longer to remove residual moisture contained in micropores of the catalyst. After the drying process is completed, a sample undergoes heat treatment under an air atmosphere. That is, a vanadium-molybdenum-titania catalyst is prepared using titania as a carrier and using the molybdenum aqueous solution with a concentration of about 3 wt %, and the vanadium aqueous solution with a concentration of about 2 wt % on the basis of the aforementioned method.

In consideration of a conversion rate for nitrogen oxides and energy efficiency, the heat treatment process is performed at a temperature of about 300° C. to about 700° C. for about 1 to about 8 hours, preferably at a temperature of about 500° C. for about 5 hours under a gas atmosphere containing nitrogen and oxygen. The heat treatment process may be performed in various known types of furnaces such as a tube-type furnace, a convection-type furnace, and a grate-type furnace, or the like, but an embodiment of the inventive concept is not particularly limited.

Additionally, the vanadium-molybdenum-antimony-titania catalyst according to an embodiment of the inventive concept may be processed together with a small amount of a binder into a particulate or monolithic form, may be prepared into a plate shape, slate shape, pellet shape, etc., or may be used by being applied onto a support that has been processed into such a shape.

Furthermore, in actual application, the vanadium-molybdenum-antimony-titania catalyst according to the inventive concept may be utilized by being applied onto a structure, such as metal plates, metal fibers, ceramic filters, honeycomb structures, and glass tubes, or onto an air purifier, interior decorations, exterior and interior materials, wallpaper, etc., and may also be utilized in rear stages of industrial processes where exhaust gas including sulfur dioxide is generated.

The vanadium-molybdenum-antimony-titania catalyst for removing nitrogen oxide in a low-temperature range has been described hitherto. Hereinafter, specific embodiments of the method for preparing the denitrification catalyst according to the inventive concept will be described with reference to the drawings.

Preparation Example 1

In preparation of a vanadium-molybdenum-antimony-titania catalyst for removing nitrogen oxide, antimony acetate ($Sb(CH_3COO)_3$) was quantified such that an Sb content was about 2 wt % with respect to the weight of the catalyst, and then the quantified antimony acetate ($Sb(CH_3COO)_3$) was dissolved in acetic acid ($CH_3COOH$) to thereby prepare an antimony aqueous solution. Subsequently, ammonium heptamolybdate tetrahydrate ($(NH_4)_6Mo_7O_{24}\cdot 4H_2O$) was quantified such that a Mo content was about 1 wt % with respect to the weight of the catalyst, and then the quantified ammonium heptamolybdate tetrahydrate was dissolved in distilled water heated to at least about 60° C. to thereby prepare a molybdenum aqueous solution. Subsequently, ammonium metavanadate ($NH_4VO_3$) was quantified such that a V content was about 2 wt % with respect to the weight of the catalyst and then quantified ammonium metavanadate was dissolved in distilled water heated to at least about 60° C. to thereby prepare a vanadium aqueous solution. In this case, in order to increase solubility of ammonium metavanadate, oxalic acid ($(COOH)_2$, amount of which satisfies the molar ratio of vanadium to oxalic acid being 1:1) was added little by little while being stirred until the pH of the vanadium aqueous solution became about 2.5. The prepared antimony aqueous solution, the molybdenum aqueous solution, and the vanadium aqueous solution were mixed with titania carrier to prepare a slurry-type mixture, then moisture was removed using a vacuum rotary evaporator, thereafter the mixture was dried in a dryer at about 103° C. for at least one day in order to completely remove moisture contained in micropores. Thereafter, the resultant mixture was baked under an air atmosphere at a temperature of about 500° C. for about 5 hours in a convection-type furnace to thereby prepare “2V1MoSbTi”.

Preparation Example 2

“2V3MoSbTi” was prepared in the same manner as in Preparation Example 1, except that, in the process of preparing the molybdenum aqueous solution in Preparation Example 1, the molybdenum content was about 3 wt % with respect to the weight of the catalyst.

Preparation Example 3

“2V5MoSbTi” was prepared in the same manner as in Preparation Example 1, except that, in the process of preparing the molybdenum aqueous solution of Preparation Example 1, the molybdenum content was about 5 wt % with respect to the weight of the catalyst.

Preparation Example 4

“2V7MoSbTi” was prepared in the same manner as in Preparation Example 1, except that in the process of preparing the molybdenum aqueous solution of Preparation Example 1, the molybdenum content was about 7 wt % with respect to the weight of the catalyst.

Preparation Example 5

In the process of adding antimony in Preparation Example 2, the prepared antimony aqueous solution and titania were mixed to prepare a slurry-type mixture, then moisture was removed using a vacuum rotary evaporator, and then the resultant mixture was dried sufficiently in a dryer for at least one day at about 103° C. in order to completely remove the moisture contained in micropores. Thereafter, antimony-titania was prepared after being calcined under an air atmosphere at a temperature of about 200° C. for about 5 hours in a convection-type furnace. Thereafter, “2V3MoSbTi” was prepared in the same manner as in Preparation Example 2 by mixing the prepared molybdenum aqueous solution and vanadium aqueous solution with antimony-titania.

Preparation Example 6

In the process of adding molybdenum in Preparation Example 2, the prepared molybdenum aqueous solution and titania were mixed to form a slurry-type mixture, and then moisture was removed using a vacuum rotary evaporator, and then the resultant mixture was dried sufficiently in a dryer for at least one day at about 103° C. in order to completely remove the moisture contained in micropores. Thereafter molybdenum-titania was prepared after being calcined under an air atmosphere at a temperature of about 200° C. for about 5 hours in a convection-type furnace. Thereafter, “2VSb3MoTi” was prepared in the same manner as in Preparation Example 2 by mixing the prepared antimony aqueous solution and vanadium aqueous solution with molybdenum-titania.

Preparation Example 7

In the process of adding antimony in Preparation Example 2, the prepared antimony aqueous solution and titania were mixed to prepare a slurry-type mixture, and then moisture was removed using a vacuum rotary evaporator, and thereafter the mixture was sufficiently dried in a dryer at about 103° C. for one day or more in order to completely remove moisture contained in micropores. Thereafter, the resultant mixture is calcined at a temperature of about 500° C. for about 5 hours under an air atmosphere in a convection-type furnace to prepare antimony-titania. Thereafter, the prepared molybdenum aqueous solution and vanadium aqueous solution were mixed with the antimony-titania to prepare “2V3MoSbTi” in the same manner as in Preparation Example 2.

Preparation Example 8

“1V3MoSbTi” was prepared in the same manner as in Preparation Example 2, except that the vanadium aqueous solution was prepared using vanadium content of about 1 wt % with respect to the weight of the catalyst in the process of adding vanadium in Preparation Example 2.

Preparation Example 9

“1.5V3MoSbTi” was prepared in the same manner as in Preparation Example 2, except that the vanadium aqueous solution was prepared using vanadium content of about 1.5 wt % with respect to the weight of the catalyst in the process of adding vanadium in Preparation Example 2.

Preparation Example 10

“3V3MoSbTi” was prepared in the same manner as in Preparation Example 2, except that the vanadium aqueous solution was prepared using vanadium content of about 3 wt % with respect to the weight of the catalyst in the process of adding vanadium in Preparation Example 2.

Preparation Example 11

“4V3MoSbTi” was prepared in the same manner as in Preparation Example 2, except that the vanadium aqueous solution was prepared using vanadium content of about 4 wt % with respect to the weight of the catalyst in the process of adding vanadium in Preparation Example 2.

Preparation Example 12

“5V3MoSbTi” was prepared in the same manner as in Preparation Example 2, except that the vanadium aqueous solution was prepared using vanadium content of about 5 wt % with respect to the weight of the catalyst in the process of adding vanadium in Preparation Example 2.

Comparative Preparation Example 1

In preparation of a vanadium-titania catalyst for removing nitrogen oxide, ammonium metavanadate ($NH_4VO_3$) was quantified such that a V content was about 2 wt % with respect to a weight of the catalyst and was dissolved in distilled water heated to at least about 60° C. to thereby prepare a vanadium aqueous solution. In this case, in order to increase solubility of ammonium metavanadate, oxalic acid $(COOH)_2$, amount of which satisfies the molar ratio of vanadium to oxalic acid being 1:1) was added to a vanadium aqueous solution little by little while being stirred until the pH of the vanadium aqueous solution became about 2.5. The prepared vanadium aqueous solution and titania were mixed to prepare a slurry-type mixture, moisture was removed using a vacuum rotary evaporator, and then the mixture was dried sufficiently in a dryer at about 103° C. for at least one day in order to completely remove moisture contained in micropores. Thereafter, the resultant mixture was calcined in a convection-type furnace at a temperature of about 500° C. for about 5 hours under an air atmosphere to prepare 2VTi.

Comparative Preparation Example 2

In preparation of a vanadium-antimony-titania catalyst for removing nitrogen oxide, antimony acetate ($Sb(CH_3COO)_3$) was quantified such that an Sb content was about 2 wt % with respect to the weight of the catalyst and then dissolved in acetic acid ($CH_3COOH$) to thereby prepare an antimony aqueous solution. Subsequently, ammonium metavanadate ($NH_4VO_3$) was quantified such that a V content was about 2 wt % with respect to the weight of the catalyst, and then dissolved in distilled water heated to at least about 60° C. to thereby prepare a vanadium aqueous solution. In this case, in order to increase solubility of ammonium metavanadate, oxalic acid $(COOH)_2$, amount of which satisfies the molar ratio of vanadium to oxalic acid being 1:1) was added to the vanadium aqueous solution little by little while being stirred until the pH of the vanadium aqueous solution became about 2.5. The prepared antimony and vanadium aqueous solutions and titania were mixed to prepare a slurry-type mixture, moisture was removed using a vacuum rotary evaporator, and then the mixture was sufficiently dried in a dryer at about 103° C. for at least one day in order to completely remove moisture contained in micropores. Thereafter, the resultant mixture was calcined in a convection-type furnace at a temperature of about 500° C. for about 5 hours under an air atmosphere to prepare 2VSbTi.

Comparative Preparation Example 3

In preparation of a vanadium-molybdenum-titania catalyst for removing nitrogen oxide, ammonium heptamolybdate tetrahydrate ($(NH_4)_6Mo_7O_{24}\cdot 4H_2O$) was quantified such that a Mo content was about 1 wt % with respect to the weight of the catalyst and then dissolved in distilled water heated to at least about 60° C. to thereby prepare a molybdenum aqueous solution. Subsequently, ammonium metavanadate ($NH_4VO_3$) was quantified such that a V content was of about 2 wt % with respect to the weight of the catalyst and then dissolved in distilled water heated to at least about 60° C. to thereby prepare a vanadium aqueous solution. In this case, in order to increase solubility of ammonium metavanadate, oxalic acid $(COOH)_2$, amount of which satisfies the molar ratio of vanadium to oxalic acid being 1:1) was added to the vanadium aqueous solution little by little while being stirred until the pH of the vanadium aqueous solution became about 2.5. The prepared molybdenum and vanadium aqueous solutions and titania were mixed to prepare a slurry-type mixture, moisture was removed using a vacuum rotary evaporator, and then the mixture was sufficiently dried in a dryer at about 103° C. for at least one day in order to completely remove moisture contained in micropores. Thereafter, the resultant mixture was calcined in a convection-type furnace at a temperature of about 500° C. for about 5 hours under an air atmosphere to prepare 2V1MoTi.

Comparative Preparation Example 4

"2V3MoTi" was prepared in the same manner as in Comparative Preparation Example 3, except that a molybdenum aqueous solution was prepared using molybdenum content of about 3 wt % with respect to the weight of the catalyst in the process of adding molybdenum in Comparative Preparation Example 3.

Comparative Preparation Example 5

"2V5MoTi" was prepared in the same manner as in Comparative Preparation Example 3, except that a molybdenum aqueous solution was prepared using molybdenum content of about 5 wt % with respect to the weight of the catalyst in the process of adding molybdenum in Comparative Preparation Example 3.

Comparative Preparation Example 6

"2V7MoTi" was prepared in the same manner as in Comparative Preparation Example 3, except that a molybdenum aqueous solution was prepared using molybdenum content of about 7 wt % with respect to the weight of the catalyst in the process of adding molybdenum in Comparative Preparation Example 3.

Comparative Preparation Example 7

"10V15Mo10SbTi" was prepared in the same manner as in Preparation Example 2 except that antimony content of about 10 wt %, a molybdenum content of about 15 wt %, and a vanadium content of about 10 wt %, with respect to the weight of the catalyst, were used respectively to prepare antimony, molybdenum, and vanadium aqueous solutions in the process of adding antimony, molybdenum, and vanadium.

Comparative Preparation Example 8

"10V15MoTi" was prepared in the same manner as in Preparation Example 3 except that a molybdenum content of about 15 wt %, and a vanadium content of about 10 wt %, with respect to the weight of the catalyst, were used respectively to prepare a molybdenum aqueous solution, and a vanadium aqueous solution in the process of adding molybdenum, and vanadium.

Comparative Preparation Example 9

In the preparation of a vanadium-tungsten-titania catalyst for removing nitrogen oxides, ammonium metatungstate ($(NH_4)_6H_2W_{12}O_{40}$) was quantified to be about 5 wt % with respect to the weight of the catalyst and then dissolved in distilled water heated to at least about 60° C. to thereby prepare a tungsten aqueous solution. Subsequently, ammonium metavanadate ($NH_4VO_3$) as a vanadium precursor was quantified to be about 2 wt % with respect to the weight of the catalyst and then dissolved in distilled water heated to at least about 60° C. to thereby prepare a vanadium precursor aqueous solution. In this case, in order to increase the solubility of ammonium metavanadate, oxalic acid (amount of which satisfies the molar ratio of vanadium to oxalic acid being 1:1) was added while being stirred little by little until the pH of the vanadium aqueous solution became about 2.5.

The prepared tungsten aqueous solution and the vanadium aqueous solution were mixed with titania to form a slurry-type mixture, moisture was removed using a vacuum rotary evaporator, and then the mixture was sufficiently dried in a dryer at about 103° C. for at least one day to completely remove moisture contained in the micropores. Finally, "2V5WTi" was prepared by baking the resultant mixture under an air atmosphere for about 5 hours at a temperature of about 500° C. in a convection-type furnace.

Compositions of catalysts according to Preparation Examples and Comparative Preparation Examples described above are listed in following Table 1.

TABLE 1

| Examples | Vanadium content (wt %) | Molybdenum Content (wt %) | Antimony Content (wt %) | Remarks | Catalyst |
|---|---|---|---|---|---|
| Preparation Example 1 | 2 | 1 | 2 | — | 2V1MoSbTi |
| Preparation Example 2 | 2 | 3 | 2 | — | 2V3MoSbTi |
| Preparation Example 3 | 2 | 5 | 2 | — | 2V5MoSbTi |
| Preparation Example 4 | 2 | 7 | 2 | — | 2V7MoSbTi |
| Preparation Example 5 | 2 | 3 | 2 | Mixing antimony with titania, heating at 200° C., and then carrying vanadium and molybdenum | 2V3MoSbTi |
| Preparation Example 6 | 2 | 3 | 2 | Mixing antimony with titania, heating at 200° C., and then carrying vanadium and molybdenum | 2VSb3MoTi |
| Preparation Example 7 | 2 | 3 | 2 | Mixing antimony with titania, heating at 500° C., and then carrying vanadium and molybdenum | 2V3MoSbTi |
| Preparation Example 8 | 1 | 3 | 2 | — | 1V3MoSbTi |
| Preparation Example 9 | 1.5 | 3 | 2 | — | 1.5V3MoSbTi |
| Preparation Example 10 | 3 | 3 | 2 | — | 3V3MoSbTi |
| Preparation Example 11 | 4 | 3 | 2 | — | 4V3MoSbTi |
| Preparation Example 12 | 5 | 3 | 2 | — | 5V3MoSbTi |
| Comparative Preparation Example 1 | 2 | — | — | — | 2VTi |
| Comparative Preparation Example 2 | 2 | — | 2 | — | 2VSbTi |
| Comparative Preparation Example 3 | 2 | 1 | — | — | 2V1MoTi |
| Comparative Preparation Example 4 | 2 | 3 | — | — | 2V3MoTi |
| Comparative Preparation Example 5 | 2 | 5 | — | — | 2V5MoTi |
| Comparative Preparation Example 6 | 2 | 7 | — | — | 2V7MoTi |
| Comparative Preparation Example 7 | 10 | 15 | 10 | — | 10V15Mo10SbTi |

TABLE 1-continued

| Examples | Vanadium content (wt %) | Molybdenum Content (wt %) | Antimony Content (wt %) | Remarks | Catalyst |
|---|---|---|---|---|---|
| Comparative Preparation Example 8 | 10 | 15 | — | — | 10V15MoTi |
| Comparative Preparation Example 9 | 2 | — | — | Carrying 5 wt % of tungsten | 2V5WTi |

Example 1

In order to confirm nitrogen oxide removal efficiency in preparation of a catalyst according to the inventive concept, NOx conversion rate was measured for the catalysts prepared according to Comparative Preparation Examples 1, and 2, Comparative Preparation Example 4, Preparation Example 2 and Comparative Preparation Example 9 to evaluate the SCR reaction characteristics under a condition of a space velocity of about 60,000 $hr^{-1}$, and the results of measurement are shown in following FIG. 1. An experimental condition and a measurement method are as follows, which are also the same in Examples 2 through 4 to be described later.

[Experimental Condition]

The experiment was performed under the conditions that a gas, under an air atmosphere, containing about 800 ppm of gaseous nitrogen oxide, about 3% oxygen, and about 6 vol % moisture was introduced into a catalytic reactor at a flow rate of about 500 cc/min and a space velocity of about 60,000 $hr^{-1}$, and the experiment temperature was in the range of about 180° C. to about 400° C. For reference, the space velocity is an index indicating an amount of target gas that may be treated by the catalyst, and the space velocity is expressed as a volume ratio of the catalyst to the total gas flow.

[Measurement Method]

The conversion rate of the gaseous nitrogen oxide was calculated according to the following Equation 1. In addition, the nitrogen oxide conversion rate was calculated by measuring the concentration of a nitrogen oxide which is produced due to non-reaction of the gaseous nitrogen oxide using a non-dispersive infrared gas analyzer (ZKJ-2, Fuji Electric Co.). Additionally, the gaseous ammonia concentration was measured using a detector tube in order to measure $NH_3$ slip which is produced due to non-reaction of gaseous ammonia injected as a reductant.

$$\text{Nitrogen oxide removal rate (\%)} = \frac{(\text{Inlet } NOx\text{ (ppm)} - \text{outlet } NOx\text{ (ppm)})}{\text{Inlet } NOx\text{ (ppm)}} \quad \text{Eq. (1)}$$

From the nitrogen oxide removal rates of Comparative Preparation Examples 1, 2, 4, and 9, and Preparation Example 2 in FIG. 1, it may be confirmed that the addition of antimony, and/or molybdenum and tungsten to Comparative Preparation Example 1 (2VTi), improves the overall low-temperature denitrification efficiency. In particular, it may be confirmed that when the catalyst was prepared by carrying antimony, molybdenum, and vanadium on titania in Preparation Example 2 (2V3MoSbTi), the better nitrogen oxide conversion rate was exhibited in a temperature range of about 200° C. to about 250° C.

Example 2

Figure 3:
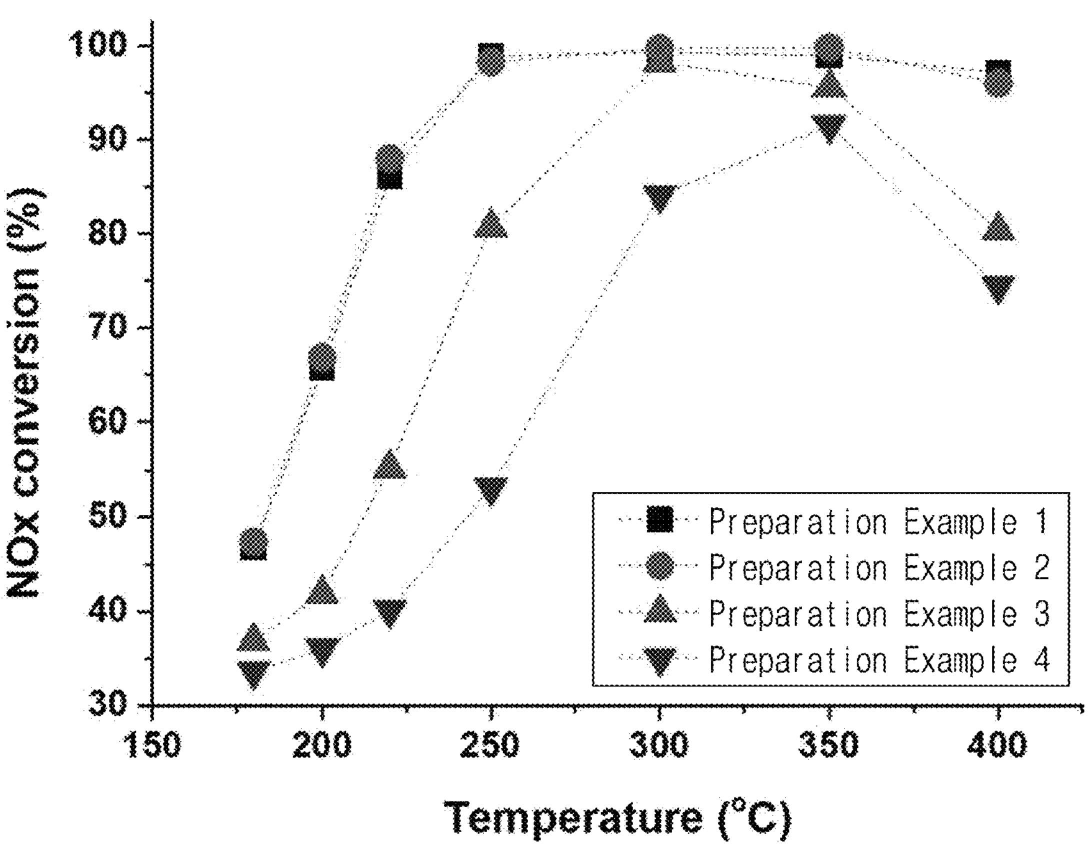
FIG. 3 is a graph showing evaluation results of denitrification performance, using an ammonia reductant, of catalysts prepared according to Preparation Examples 1 through 4, in order to evaluate the denitrification performance of a denitrification catalyst according to the inventive concept.

Different nitrogen oxide removal efficiency was shown, according to different amount of added molybdenum, as shown in the nitrogen oxide removal rate in Examples 1 through 4 (2VxMoSbTi) in FIG. 3. Particularly, it may be confirmed that among 2VxMoSbTi catalysts, a catalyst (2V3MoSbTi) prepared according to Preparation Example 2 carrying about 3 wt % of molybdenum with respect to the weight of the catalyst, exhibits a best nitrogen oxide conversion rate in a temperature range of about 200° C. to about 250° C.

Figure 4:
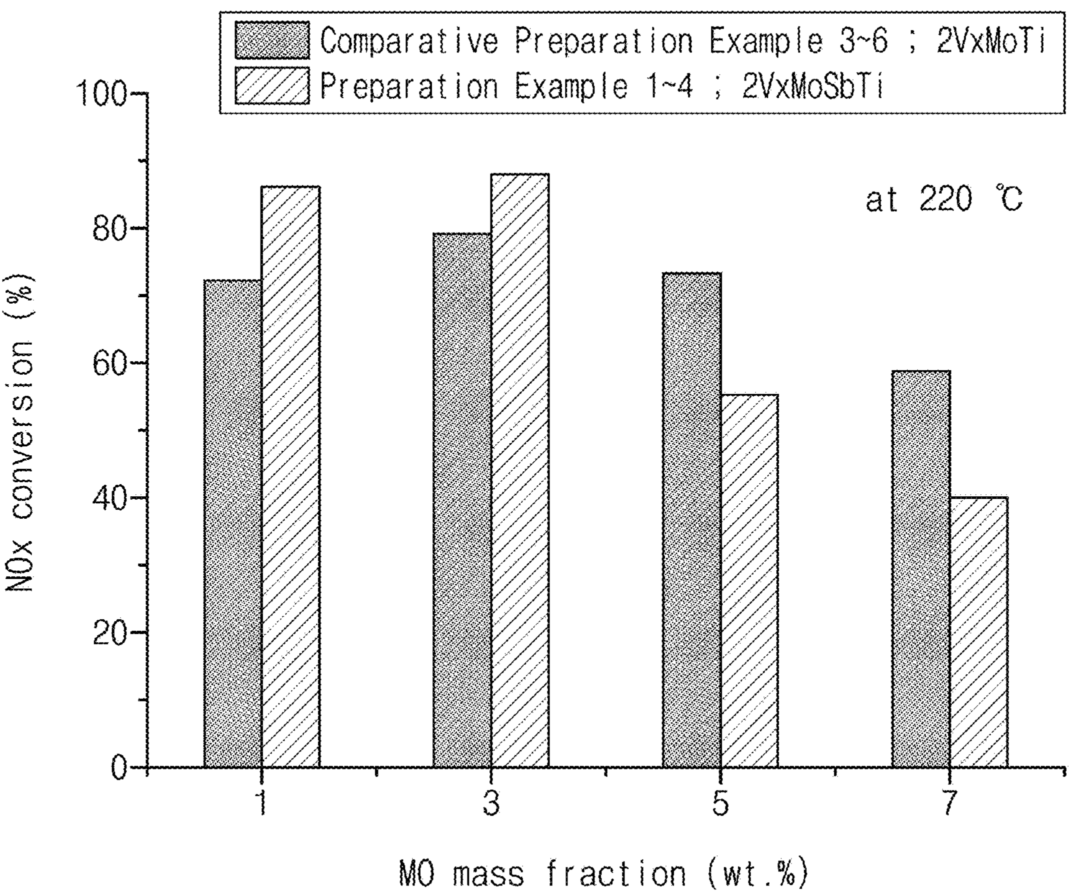
FIG. 4 is a graph showing evaluation results of denitrification performance at about 220° C., using an ammonia reductant, of catalysts prepared according to Comparative Preparation Examples 3 through 6 and Preparation Examples 1 through 4, in order to evaluate the denitrification performance of a denitrification catalyst according to the inventive concept.

FIG. 4 shows nitrogen oxide removal rates of Comparative Preparation Examples 3 through 6 (2VxMoTi) and Preparation Examples 1 through 4 (2VxMoSbTi) at a temperature of about 220° C. It can be seen that catalysts containing antimony, according to Preparation Examples 1(2V1MoSbTi) and 2(2V3MoSbTi), exhibit excellent nitrogen oxide conversion rate. On the other hand, catalysts according to Preparation Examples 3 (2V5MoSbTi) and 4 (2V7MoSbTi) exhibited lower nitrogen oxide conversion rate than catalysts according to Comparative Preparation Examples 5 (2V5MoTi) and 6 (2V7MoTi). In particular, it may be confirmed that a catalyst prepared according to Preparation Example 2 (2V3MoSbTi) carrying about 2 wt % of antimony and about 3 wt % of molybdenum with respect to the weight of the catalyst, exhibits the best nitrogen oxide conversion rate at about 220° C.

Example 3

On the basis of the results in Examples 1 and 2, in order to confirm an effect of a metal carrying method and order on the conversion rate of nitrogen oxide, an additional experiment was conducted on a vanadium-molybdenum-antimony-titania catalyst using various carrying methods such as an impregnation method. The experimental condition was same as in Example 1 and vanadium-molybdenum-antimony-titania catalysts were used which have been prepared according to Preparation Examples 2, 5, and 7 according to the metal carrying method and order.

Figure 5:
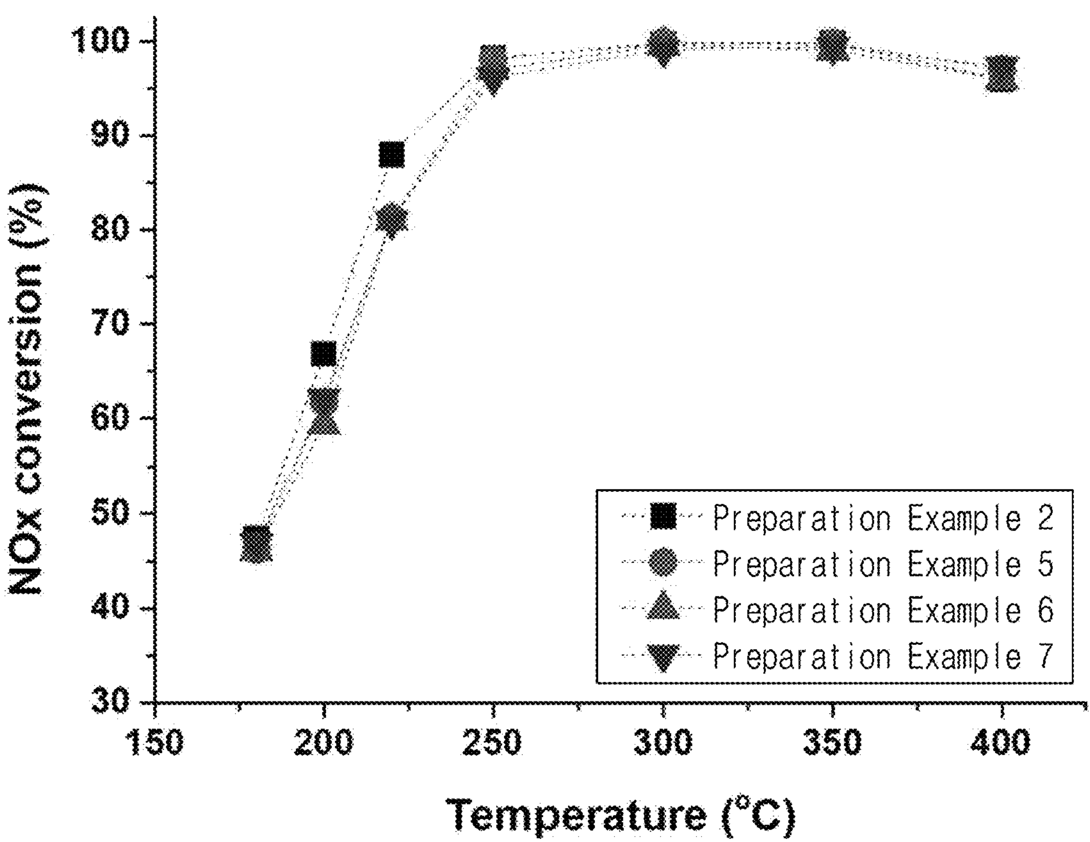
FIG. 5 is a graph showing evaluation results of denitrification performance, using an ammonia reductant, of catalysts prepared according to Comparative Preparation Example 2 and Preparation Examples 5 through 7, in order to evaluate the denitrification performance of a denitrification catalyst according to the inventive concept.

FIG. 5 shows that there is a difference in the nitrogen oxide conversion rate and activity efficiency between vanadium-molybdenum-antimony-titania catalysts according to Preparation Examples 2, 5, and 7 according to the metal carrying method and order. Preparation Example 5 in which titania was mixed with an antimony precursor, then the mixture was dried and calcined at about 200° C. and then a vanadium precursor and a molybdenum precursor were carried, Preparation Example 6 in which titania was mixed with antimony, then the mixture was dried and calcined at about 500° C. and then a vanadium precursor and an antimony precursor were carried, and Preparation Example 7 in which titania was mixed with an antimony precursor, then the mixture was dried and calcined at about 500° C. and then vanadium and molybdenum precursors were carried, exhibited similar level of the nitrogen oxide conversion rate. In particular, it may be confirmed that Preparation Example 2, in which an antimony precursor, a molybdenum precursor, and a vanadium precursor were carried on titania, exhibited the best nitrogen oxide conversion rate in a temperature range of about 200° C. to about 250° C. A preparation method corresponding to Preparation Example 2 is significant in that the catalyst may be prepared in a simple preparation process by reducing the number of cycles of heat treatment process to one cycle in preparation of catalysts.

Example 4

On the basis of the result in Example 3, an experiment was conducted in order to confirm the effect of adding various amounts of vanadium to a vanadium-molybdenum-antimony-titania catalyst on the nitrogen oxide conversion rate. The experimental condition is same manner as Example 1 described above, catalysts were used which have been prepared according to Preparation Examples 2, and 8 through 12 according to vanadium content.

Figure 6:
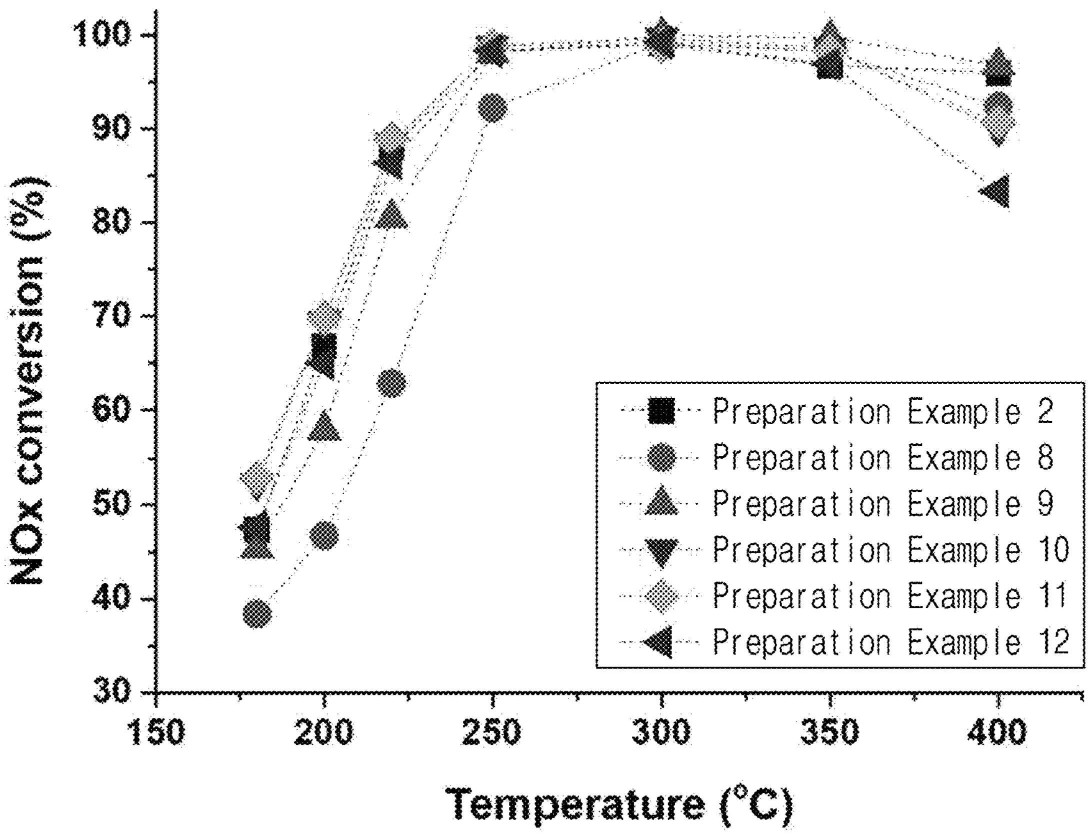
FIG. 6 is a graph showing evaluation results of denitrification performance, using ammonia as a reducing agent, of catalysts prepared according to Preparation Examples 2 and 8 through 12, in order to evaluate the denitrification performance of a denitrification catalyst according to the inventive concept.

In FIG. 6, it may be confirmed that the nitrogen oxide conversion rate was increased in a temperature range from about 180° C. to about 250° C. as vanadium content is increased from about 1 wt % (Preparation Example 8) to about 3 wt % (Preparation Example 10). Meanwhile, a catalyst containing about 4 wt % of vanadium (Preparation Example 11) exhibited a similar lower-temperature nitrogen oxide conversion rate as a catalyst containing about 3 wt % of vanadium (Preparation Example 10). On the other hand, the lower-temperature nitrogen oxide conversion rate of a catalyst containing about 5 wt % of vanadium (Preparation Example 12) is rather decreased as vanadium content increases.

Example 5

In preparation of a catalyst according to the inventive concept, in order to confirm an effect on catalyst durability against sulfur dioxide, an experiment for catalyst durability against sulfur dioxide was performed, by injecting sulfur dioxide during a nitrogen oxide removal reaction, on catalysts according to Comparative Preparation Examples 1, 2, and 4, Preparation Example 2, and Comparative Preparation Example 9, and an experimental condition was as follows.

[Experimental Condition]

The experiment was performed under the conditions that a gas, under an air atmosphere, containing about 250 ppm of gaseous nitrogen oxide, about 15 vol % oxygen, and about 6 vol % moisture, and a ratio of ammonia to nitrogen oxides of about 0.98, was introduced into a catalytic reactor at a flow rate of about 500 cc/min, a space velocity of about 30,000 $hr^{-1}$ and the experiment was conducted under an air atmosphere at a temperature of about 220° C. In the experiment for durability against sulfur dioxide, a change in nitrogen oxide removal performance per reaction time was measured by injecting moisture and sulfur dioxide during the nitrogen removal reaction of catalysts prepared according to the catalyst preparation method described above.

Figure 7:
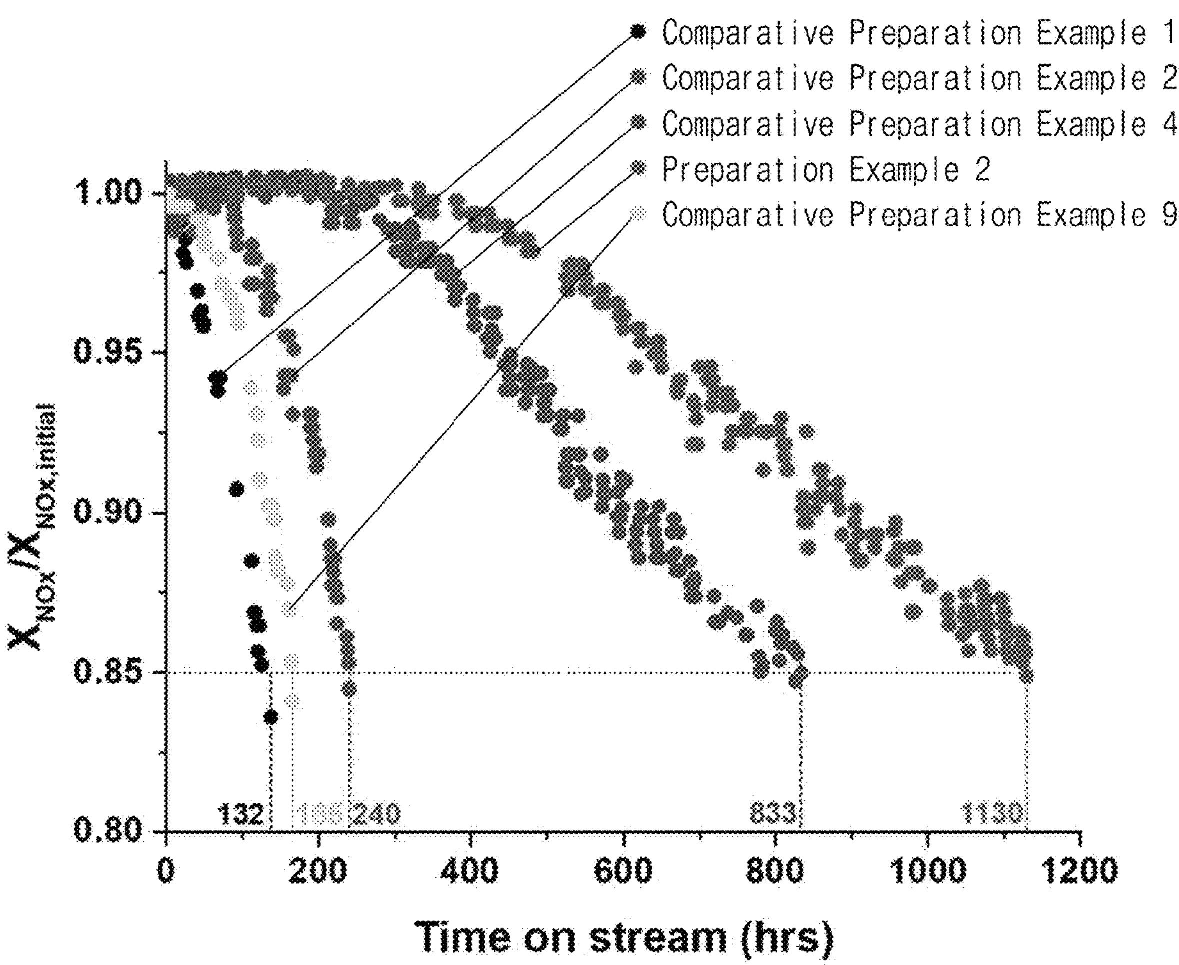
FIG. 7 is a graph showing evaluation results of denitrification performance with the lapse of time after injection of sulfur dioxide, using an ammonia reductant, of catalysts prepared according to Comparative Preparation Examples 1, 2 and 4, Preparation Example 2, and Comparative Preparation Example 9, in order to evaluate durability of a denitrification catalyst according to the inventive concept against sulfur dioxide.

Referring to a result in FIG. 7, Preparation Example 2 (2V3MoSbTi) showed the best durability against sulfur dioxide. In a selective catalytic reduction reaction for the catalysts according to Comparative Preparation Example 1 (2VTi), Comparative Preparation Example 9 (2V5WTi), Comparative Preparation Example 2 (2VSbTi), Comparative Preparation Example 4 (2V3MoTi) and Preparation Example 2 (2V3MoSbTi), the nitrogen oxide removal rates were reduced to about 85% of the initial performance due to deactivation of the catalysts after injecting moisture of about 6 vol % and sulfur dioxide of about 75 ppm, and times taken to reach the reduced nitrogen oxide removal rates were respectively about 132, about 165, about 240, about 833 and about 1130 hours. Preparation Example 2 (2V3MoSbTi) shows more enhanced durability against sulfur dioxide due to addition of antimony and molybdenum.

Example 6

Figure 8:
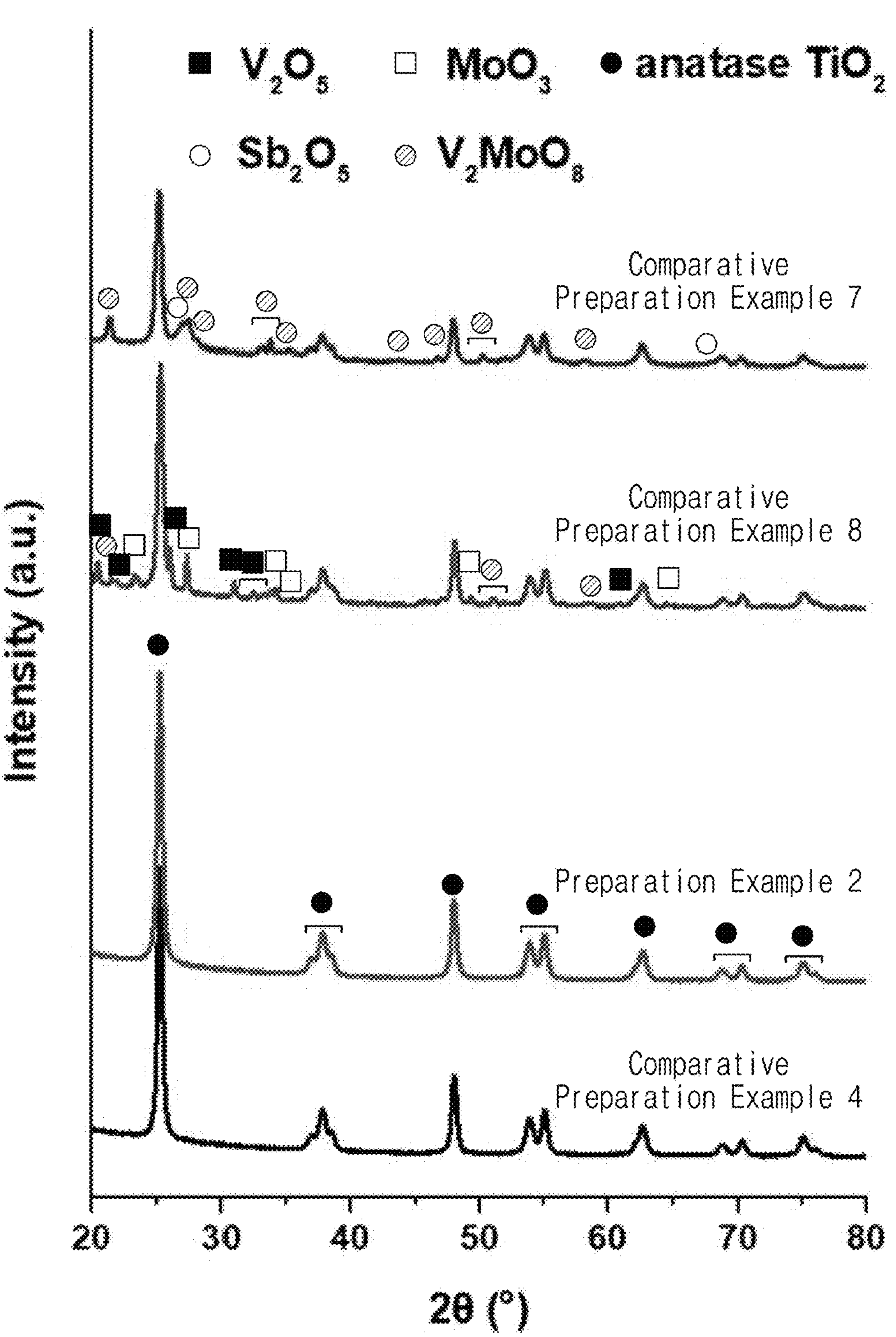
FIG. 8 is a graph showing X-ray diffraction patterns (XRD patterns) of catalysts prepared according to Preparation Example 2, Comparative Preparation Examples 4, 7, and 8, with regard to X-ray diffraction patterns (XRD patterns) of a denitrification catalyst according to the inventive concept.

The crystal structures of the catalysts according to Preparation Example 2 (2V3Mo2SbTi), Comparative Preparation Example 4 (2V3MoTi), Comparative Preparation Example 7 (10V15Mo10SbTi), and Comparative Preparation Example 8 (10V15MoTi) were analyzed through X-ray diffractometer, and the resulting X-ray patterns (XRD patterns) as a result were shown. Referring to FIG. 8, in both of the catalysts according to Preparation 2 (2V3Mo2SbTi) and Comparative Preparation Example 4 (2V3MoTi), only crystal planes of anatase phase, which have tetragonal crystal structure indicating a titania carrier, were observed but a peak for crystal metal oxide was not observed. This is because a crystal particle size or content of the metal oxide distributed on the carrier is considered to be too small to be analyzed through X-ray diffraction analysis. Therefore, X-ray diffraction analysis was performed on the catalysts according to Comparative Preparation Example 7 (10V15Mo10SbTi) and Comparative Preparation Example 8 (10V15MoTi), in which the amounts of metal oxides contained in the catalysts were increased by about 5 times. In the catalyst according to Comparative Preparation Example 7 (10V15Mo10SbTi), peaks corresponding to $V2MoO_8$, and Sb205 were observed. Meanwhile, in the catalyst according to Comparative Preparation Example 8 (10V15MoTi), peaks corresponding to $V_2O_5$, $V_2MoO_8$, and $MoO_3$ were observed, and particularly, the peak corresponding to $V_2MoO_8$ was observed very little. From the above result, it is confirmed that vanadium oxide and molybdenum oxide was present in the form of $V_2MoO_8$ in VMoSbTi, but was mostly present in the form of $V_2O_5$ and $MoO_3$ in VMoTi.

Figure 9:
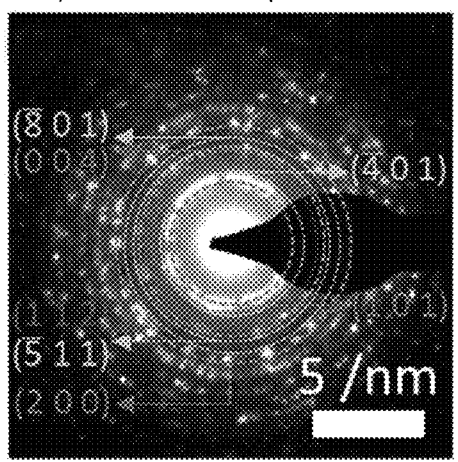
FIG. 9 is a graph showing selected area electron diffraction patterns (SAED patterns) of catalysts prepared according to Preparation Example 2, Comparative Preparation Examples 4, 7, and 8, with regard to SAED patterns of a denitrification catalyst according to the inventive concept.
Figure 9:
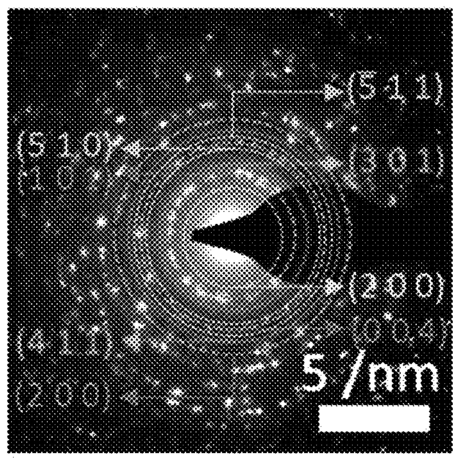
Figure 9:
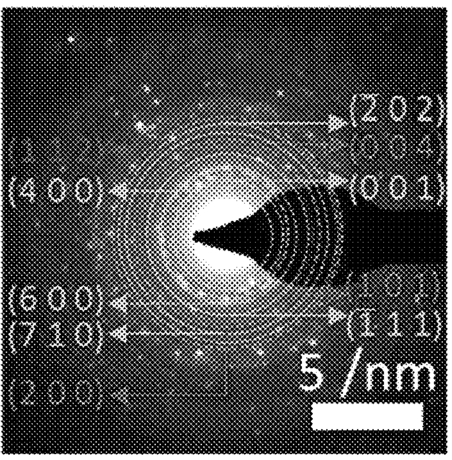
Figure 9:
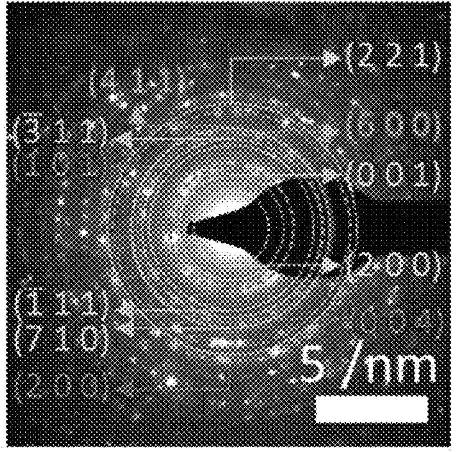

To more accurately analyze the crystalline form of metal oxide, selected area electron diffraction (SAED) pattern analysis was performed on the catalysts according to Preparation Example 2 (2V3Mo2SbTi), Comparative Preparation Example 4 (2V3MoTi), Comparative Preparation Example 7 (10V15Mo10SbTi) and Comparative Preparation Example 8 (10V15MoTi). Referring to FIG. 9, in the catalysts according to Preparation Example 2 (2V3Mo2SbTi) and Comparative Preparation Example 7 (10V15Mo10SbTi), circular rings corresponding to crystal planes of anatase $TiO_2$, $V_2MoO_8$, and $SbVO_4$ were exhibited. However, in the catalysts according to Comparative Preparation 4 (2V3MoTi) and Comparative Preparation 8 (10V15MoTi), circular rings corresponding to crystal planes of anatase $TiO_2$, $MoO_3$, and $V_2MoO_8$ were observed.

From the results of X-ray diffraction analysis and selected area electron diffraction pattern analysis, vanadium oxide of VMoSbTi is mostly present as a $V_2MoO_8$ structure and is partially present as an $SbVO_4$ structure. On the other hand, it is confirmed that the main structure of vanadium oxide constituting VMoTi is in the form of $V_2O_5$ and molybdenum oxide is present as a $MoO_3$ structure (a $V_2O_5$ structure and a $V_2MoO_8$ structure were observed). It was shown that the vanadium oxide structure transformed from $V_2O_5$ into $V_2MoO_8$ by adding Sb to VMoTi.

Example 7

Figure 10:
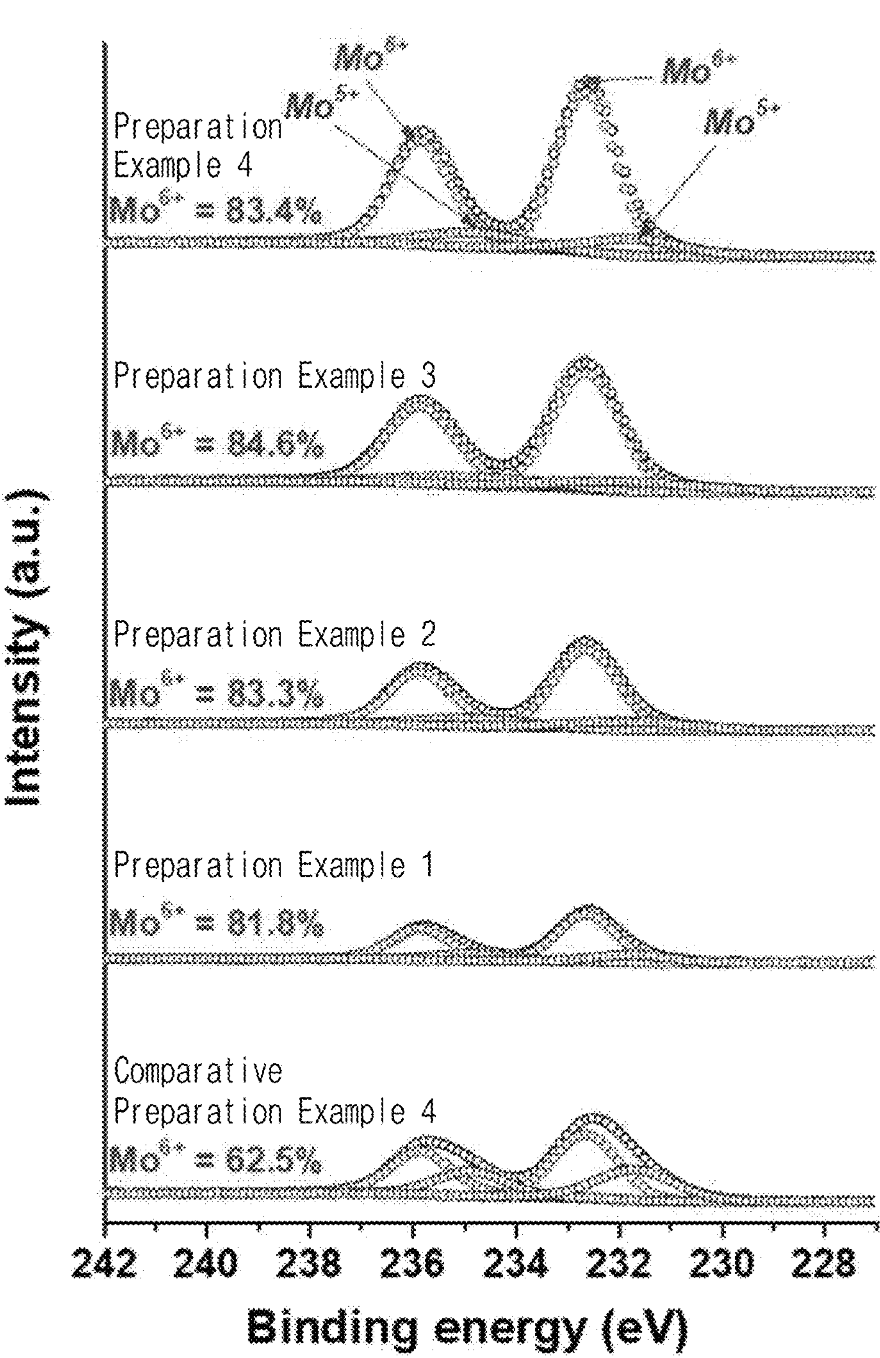
FIG. 10 is a graph that compares a ratio of molybdenum ($Mo^{6+}$) having an oxidation number of +6 to the total amount of molybdenum in molybdenum oxide using X-ray photoelectron spectroscopy (XPS), for the catalysts prepared according to Comparative Preparation Example 4 and Preparation Examples 1 through 4, in order to confirm types and distribution of molybdenum oxides formed on the surface of the denitrification catalyst according to the inventive concept.

XPS results of Mo 3d were analyzed for the catalysts prepared according to Comparative Preparation Example 4 and Preparation Examples 1 through 4, and separated by the Gaussian-Lorentzian method, and a ratio of molybdenum ($Mo^{6+}$) having an oxidation number of +6 to total molybdenum present on the surface of the catalyst was shown. Referring to the results in FIG. 10, $Mo^{6+}$ ratios of the catalysts prepared according to Comparative Preparation Example 4 (2V3MoTi), Preparation Example 1 (2V1MoSbTi), Preparation Example 2 (2V3MoSbTi), Preparation Example 3 (2V5MoSbTi), and Preparation Example 4 (2V7MoSbTi) were about 62.5%, about 81.8%, about 83.3%, about 84.6%, and about 83.4%, respectively. The 2V3MoTi which does not contain antimony has a relatively low $Mo^{6+}$ ratio of about 62.5%, whereas 2VxMoSbTi which contains antimony has a high ratio of about 81.8% to about 84.6%.

Figure 11:
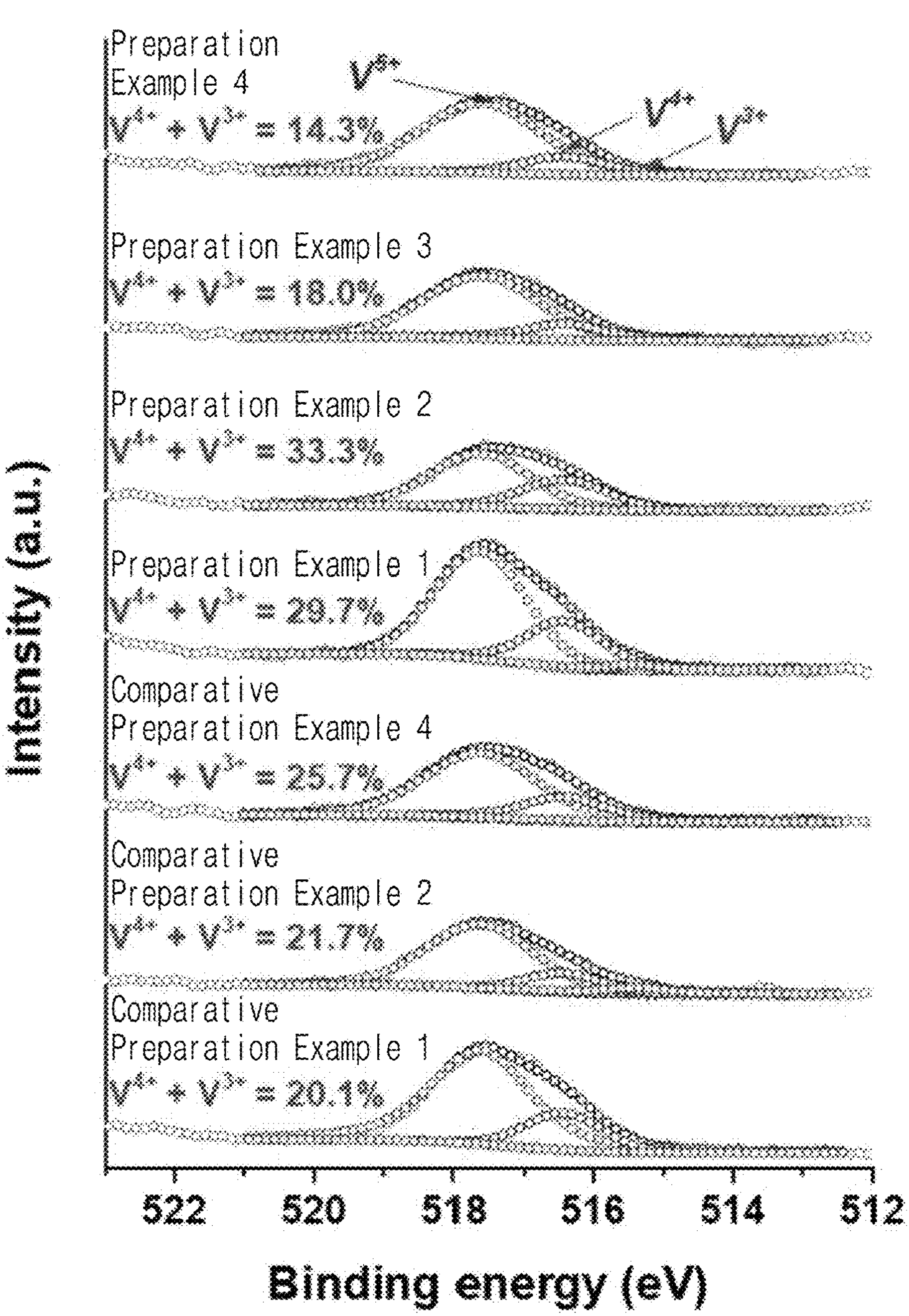
FIG. 11 is a graph showing a ratio of vanadium ($V^{4+}$+$V^{3+}$) having an oxidation number of +4 and +3 to the total amount of vanadium in vanadium oxide, using X-ray photoelectron spectroscopy (XPS), for the catalysts prepared according to Comparative Preparation Examples 1, 2, 4 and Preparation Examples 1 to 4, in order to confirm types and distribution of vanadium oxides formed on the surface of the denitrification catalyst according to the inventive concept.
Figure 12:
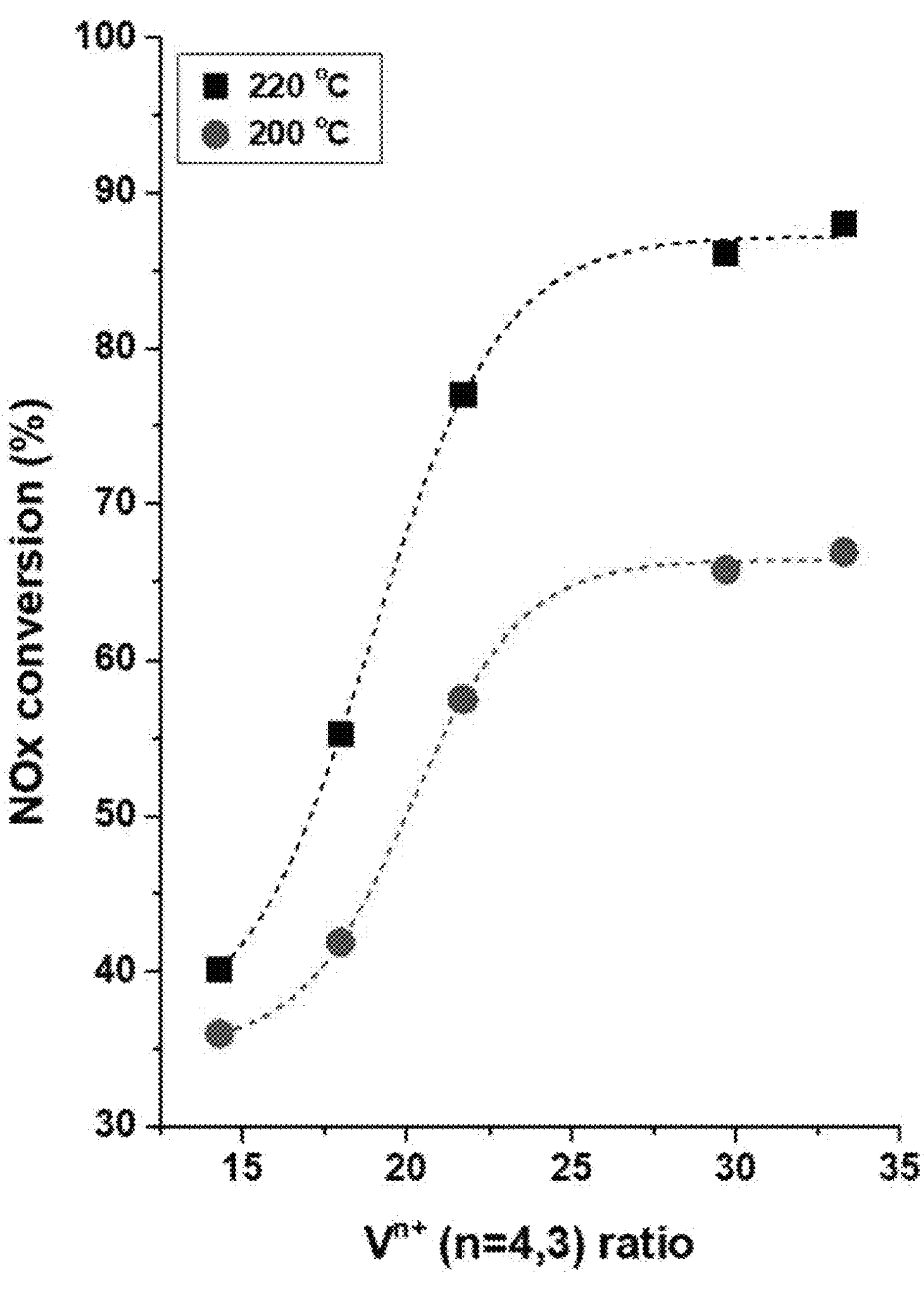
FIG. 12 is a graph showing a correlation between denitrification performance at about 220° C. and about 200° C. and a ratio of vanadium ($V^{4+}$+$V^{3+}$) having an oxidation number of +4 and +3 to the total amount of vanadium in vanadium oxide, for catalysts prepared according to Comparative Preparation Example 2 and Preparation Examples 1 through 4, in order to confirm nitrogen oxide removal efficiency with respect to vanadium oxide distribution according to a molybdenum content contained in a denitrification catalyst according to the inventive concept.

Subsequently, in the same manner as the above-described XPS analysis, the XPS analysis results of V 2p were analyzed for the catalysts prepared according to Comparative Preparation Examples 1, 2, and 4, and Preparation Examples 1 through 4 were separated, and the types and distribution proportions of vanadium oxide present on the catalyst surface were shown. Referring to the result of FIG. 11, it was shown that a ratio of vanadium having oxidation numbers of +4 and +3 to the total vanadium is in a descending order of Preparation Example 2 (2V3MoSbTi; about 33.3%)>Preparation Example 1 (2V1MoSbTi; about 29.7%)>Comparative Preparation Example 4 (2V3MoTi; about 25.7%)>Comparative Preparation Example 2 (2VSbTi; about 21.7%)>Comparative Preparation Example 1 (2VTi; about 20.1%)>Production Example 3 (2V5MoSbTi; about 18.0%)>Preparation Example 4 (2V7MoSbTi; about 14.3%). On the basis of the ratio of the vanadium ($V^{4+}+V^{3+}$), the correlation was exhibited between the ratio of vanadium ($V^{4+}+V^{3+}$) having oxidation numbers of +4 and +3 to total vanadium according to a molybdenum content (0, 1, 3, 5 and 7 wt %) in 2VxMoSbTi catalyst and the nitrogen oxide conversion rate. Referring to the results in FIG. 12, it may be confirmed that the low-temperature nitrogen oxide conversion rate at about 220° C. and about 200° C. increases as the ratio of vanadium ($V^{4+}+V^{3+}$) having oxidation numbers +4 and +3 to total vanadium increases.

Example 8

On the basis of the result in Example 5, in order to confirm an effect of an adsorption amount of sulfur dioxide included in exhaust gas on the catalyst durability in preparation of a catalyst according to the inventive concept, the adsorption amounts of the catalysts prepared according to Comparative Preparation Example 1 (2VTi), Comparative Preparation Example 2 (2VSbTi), Comparative Preparation Example 4 (2V3MoTi), Preparation Example 2 (2V3MoSbTi) and Comparative Preparation Example 9 (2V5WTi) were measured and the measurement results were listed in Table 2.

[Measurement Method]

An analysis was performed using the AutoChem II-2920 chemisorption analyzer made by Micromeritics Instrument Corp. and the HPR20m mass spectrometer made by Hidden Analytical Ltd. In the experiment, after putting 0.1 g of the catalyst in the reactor, about 1% of sulfur dioxide gas was injected at a temperature of about 220° C. for about 1 hour to allow adsorption, and then argon gas was injected for about 1 hour to exclude sulfur dioxide that has been physically adsorbed. Thereafter, the temperature of the reactor was raised from about 220° C. to about 1000° C. at a rate of about 10° C./min, and the gas desorbed at the rear stage was measured using a mass spectrum analyzer. The intensity of sulfur dioxide (m/e, molecular weight=64) that was desorbed as the temperature rises was measured, then an area was calculated by integrating the intensity, thereby the adsorption amount of each catalyst was calculated through a standardization calculation process, and the result was listed.

TABLE 2

| Examples | Arrival time(hr) $X_{NOx}/X_{NOx,\ initial}$ | Sulfur dioxide adsorption amount ($\mu mol_{SO2}\ g^{-1}{}_{CAT}$) |
|---|---|---|
| Comparative Preparation Example 1 | 132 | 167.1 |
| Comparative Preparation Example 2 | 240 | 58.3 |
| Comparative Preparation Example 4 | 833 | 24.0 |
| Preparation Example 2 | 1130 | 7.0 |
| Comparative Preparation Example 9 | 165 | 63.7 |

Referring to results in Table 2, the respective catalysts exhibit different adsorption amounts of sulfur dioxide in the descending order of Comparative Preparation Example 1 (2VTi; about 167.1 $\mu mol_{so2}\ g^{-1}{}_{CAT}$)>Comparative Preparation Example 9 (2V5WTi; about 63.7 $\mu mol_{so2}\ g^{-1}{}_{CAT}$) >Comparative Preparation Example 2 (2VSbTi; about 58.3 $\mu mol_{so2}\ g^{-1}{}_{CAT}$)>Comparative Preparation Example 4 (2V3MoTi; about 24.0 $\mu mol_{so2}\ g^{-1}{}_{CAT}$)>Preparation Example 2 (2V3MoSbTi; about 7.0 $\mu mol_{so2}\ g^{-1}{}_{CAT}$). Then, on the basis of the above-described result, the correlation between sulfur dioxide adsorption amount and the catalyst durability was investigated.

Figure 13:
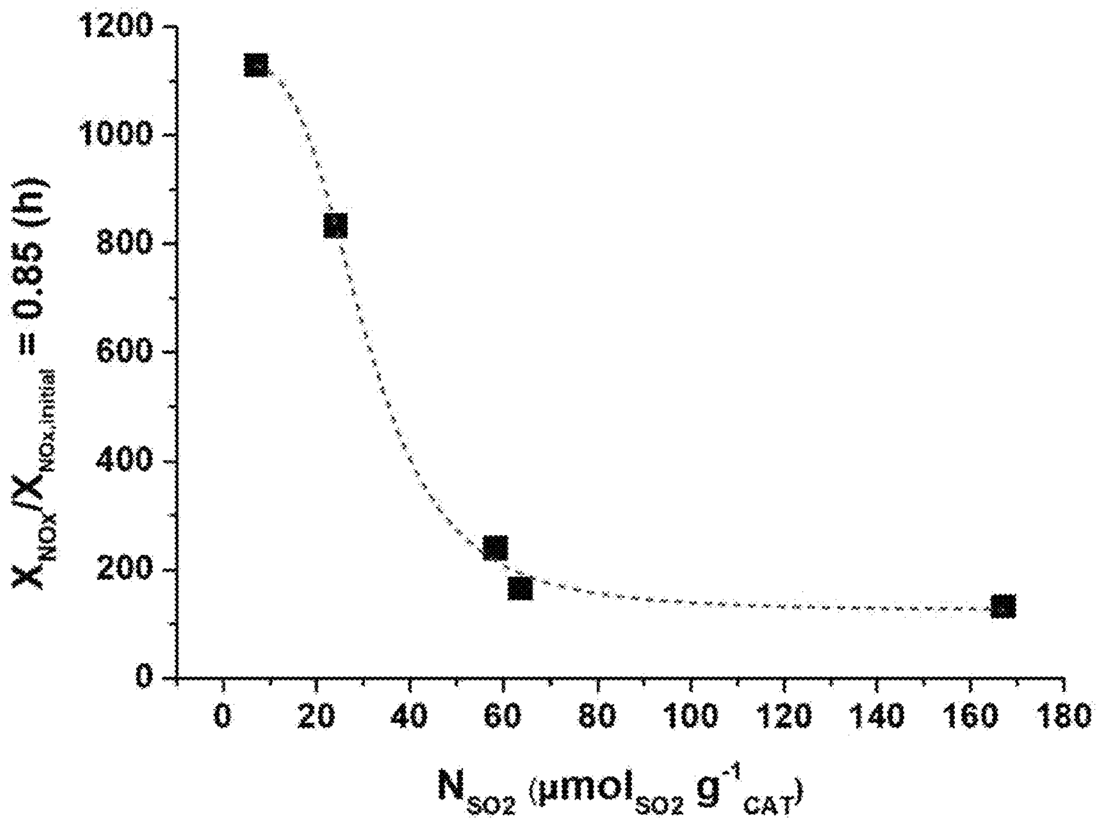
FIG. 13 is a graph showing a correlation between an adsorption amount of sulfur dioxide and an arrival time of $X_{Nox}/X_{Nox,initial}$=0.85 indicating a durability against sulfur dioxide, for catalysts prepared according to Comparative Preparation Examples 1, 2, 4, Preparation Example 2 and Comparative Preparation Example 9, with regard to an adsorption amount of sulfur dioxide and durability against sulfur dioxide of a denitrification catalyst according to the inventive concept.

The results in FIG. 13 demonstrates that the durability after injection of sulfur dioxide during the denitrification reaction tends to be increased as the adsorption amount of sulfur dioxide decreases in the catalysts prepared according to Comparative Preparation Example 1 (2VTi), Comparative Preparation Example 2 (2VSbTi), Comparative Preparation Example 4 (2V3MoTi), Preparation Example 2 (2V3MoSbTi) and Comparative Preparation Example 9 (2V5WTi). Particularly, it is confirmed that the catalyst according to Preparation 2 (2V3MoSbTi) showed the lowest sulfur dioxide adsorption amount of about 7.0 $\mu mol_{so2}\ g^{-1}{}_{CAT}$, and, in a durability test, the longest time taken to decrease to about 85% of the initial performance ($X_{NOx}$/$X_{Nox}$, initial=0.85) was about 1130 hours.

According to embodiments of the inventive concept, by controlling the vanadium oxidation rate in a denitrification catalyst, a ratio of vanadium ($V^{4+}+V^{3+}$) having oxidation numbers of +4 and +3 to total vanadium in vanadium oxides is maintained at about 25% or more, a ratio of molybdenum (Mo6+) having an oxidation number +6 to total molybdenum in molybdenum oxides is maintained at about 80% or more, and thus a catalyst may be provided, which exhibits excellent nitrogen oxide removal efficiency even in a low temperature range of about 300° C. or less. In addition, a denitrification catalyst for removing nitrogen oxides having excellent durability against sulfur dioxide ($SO_2$) contained in exhaust gas may be provided.

Hitherto, although the embodiments of the inventive concept have been described, it is understood that the inventive concept should not be limited to these embodiments but various changes and modifications can be made by one ordinary skilled in the art within the spirit and scope of the inventive concept as hereinafter claimed. Therefore, it should be understood that the embodiments described above are exemplarily in all respects and not limited thereto.

Statement Regarding Prior Disclosures by the Inventor or a Joint Inventor

The inventors of the present application have made related disclosure in Dong Wook Kwon et al., "New insight into the role of Mo—Sb addition towards VMoSbTi catalysts with enhanced activity for selective catalytic reduction with NH3," Chemical Engineering Journal, 2022, Volume 428, 132078. The related disclosure was available online on Aug. 28, 2021. Since the end of the one-year grace period (Aug. 28, 2022) was Sunday, the one-year grace period is extended to the next succeeding business day (Aug. 29, 2022). MPEP 2153.01(a). Thus, the present application was effectively filed on Aug. 29, 2022 within the one-year grace period. The authors of the related disclosure include two authors, Jeongeun Choi and Ki Bok Nam, who are not the joint inventors of the present application. These authors worked as an equipment operator and a technician and did not make contribution to conception of the invention, and thus are not included in the joint inventors of the present application. Accordingly, the related disclosure is disqualified as prior art under 35 USC 102(a)(1) against the present application. See MPEP 2155.01 and 35 USC 102(b)(1)(A).

What is claimed is:

1. A quaternary denitrification catalyst comprising vanadium-molybdenum-antimony-titania, used in a selective catalytic reduction (SCR) reaction using an ammonia reductant to remove nitrogen oxides included in exhaust gases, wherein antimony, molybdenum and vanadium are carried on a titania carrier, and molybdenum and vanadium are combined to be present in a form of a complex oxide ($V_2MoO_8$).

2. The denitrification catalyst of claim 1, wherein an amount of vanadium present in the form of the complex oxide and having an oxidation number of +4 and an oxidation number of +3 ($V^{4+}$+$V^{3+}$), is at least about 25% of the total amount of vanadium.

3. The denitrification catalyst of claim 1, wherein an amount of molybdenum present in the form of the complex oxide and having an oxidation number of +6 ($Mo^{6+}$) is at least about 80% of the total amount of molybdenum.

4. The catalyst of claim 1, wherein the denitrification catalyst is processed into at least one type selected from the group consisting of a particle type, a plate type, a corrugate type, a pellet type, a spherical type, or a honeycomb type.

5. A method for removing a nitrogen oxide in exhaust gases using the denitrification catalyst according to claim 1, the method comprising causing the denitrification catalyst to pass through exhaust gas containing ammonia and nitrogen oxide or exhaust gas containing nitrogen oxide and sulfur dioxide.

* * * * *